(12) United States Patent
Hamauzu

(10) Patent No.: US 8,779,721 B2
(45) Date of Patent: Jul. 15, 2014

(54) CHARGING SYSTEM

(75) Inventor: Akira Hamauzu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 13/419,027

(22) Filed: Mar. 13, 2012

(65) Prior Publication Data

US 2012/0235639 A1 Sep. 20, 2012

(30) Foreign Application Priority Data

Mar. 17, 2011 (JP) ................................. 2011-058708

(51) Int. Cl.
*H02J 7/00* (2006.01)
(52) U.S. Cl.
USPC .......................................... 320/109; 439/188
(58) Field of Classification Search
USPC .......................................... 320/109; 439/188
See application file for complete search history.

(56) References Cited

U.S. PATENT DOCUMENTS

| | | | | |
|---|---|---|---|---|
| 5,504,414 A | * | 4/1996 | Kinoshita | 180/65.8 |
| 5,627,448 A | * | 5/1997 | Okada et al. | 439/133 |
| 7,950,943 B2 | * | 5/2011 | Ohtomo | 439/299 |
| 8,183,821 B2 | * | 5/2012 | Sakurai | 320/104 |
| 8,301,322 B2 | * | 10/2012 | Mitsutani | 701/22 |
| 8,344,692 B2 | * | 1/2013 | Sakurai | 320/109 |
| 8,541,978 B2 | * | 9/2013 | Fukuo et al. | 320/109 |

FOREIGN PATENT DOCUMENTS

JP 07-274309 A 10/1995

* cited by examiner

*Primary Examiner* — Edward Tso
*Assistant Examiner* — Ramy Ramadan
(74) *Attorney, Agent, or Firm* — Squire Patton Boggs (US) LLP

(57) ABSTRACT

In a charging system, an interlock switch is configured to be turned on when a power switch of a vehicle body is turned off and turned off when the power switch is turned on is disposed between a negative terminal of a battery and a second negative input portion. A first positive output portion and a second positive output portion are connected to each other with a coil of a relay circuit installed in the charger body interposed therebetween. A relay switch of the relay circuit in which on and off operations are switched by the coil is connected to the first positive output portion.

14 Claims, 19 Drawing Sheets

CHARGING SYSTEM

BACKGROUND

1. Field

The present invention relates to a charging system that charges a battery installed in a vehicle body.

2. Description of Related Art

In Patent Literature 1 (JP-A No. H7-274309), when an external battery charger is pulled by mistake at the time of charging a battery mounted in the vehicle being driven, a change-over switch that changes over a line of the battery to a controller and a charger is installed in order to prevent a short-circuit of the battery or an electrical shock accident and the change-over is operated in conjunction with a main switch.

However, when output voltage of a battery changes over by using a change-over switch, the battery is provided with high voltage for driving a vehicle, and as a result, a change-over contact to endure large arc or spark, having a large capacity, is required, such that the change-over switch is expensive, and thus higher costs are incurred in order to build or manufacture a vehicle such as a motorcycle.

Therefore, the present invention is contrived to address this and other problems in the related art. An object of the present invention is to provide an inexpensive charging system capable of performing charging only in the case where a main switch is in an off state at the time of charging a battery for a vehicle.

SUMMARY

In order to achieve the above object, according to a first embodiment, a charging system for charging a battery operates by connecting a charger connector having a positive output section and a negative output section installed in a charger body to a vehicle-body charging connector. The connector can have a positive input section and a negative input section connected to a positive terminal and a negative terminal of the battery installed in a vehicle body. The negative input section can include a first negative input portion and a second negative input portion and an interlock switch interlocked with a power switch. The charging system can be turned on when the power switch of the vehicle body is turned off and turned off when the power switch is turned on. The system can be installed between the negative terminal of the battery and the second negative input portion. The positive output section includes a first positive output portion connected to the positive input section and a second positive output portion connected to the second negative input portion. The first positive output portion and the second positive output portion are connected to each other with a coil of a relay circuit installed in the charger body interposed therebetween. A normally opened relay switch of the relay circuit in which on and off operations are switched by the coil is connected to the first positive output portion. The power switch is turned off and the charger connector and the vehicle-body charging connector are connected to each other, and as a result, current from the battery is applied to the coil through the positive input section and the first positive output portion and the second negative input portion and the second positive output portion to turn on the normally opened relay switch.

According to another embodiment of the invention, a cover section for preventing contact between the positive input section and the negative input section, and an external conductor is mounted on the vehicle-body charging connector.

According to another embodiment of the invention, the vehicle-body charging connector is installed obliquely downward in the vehicle body at the left side of a leg shield installed in front of a seat which a rider sits on.

According to another embodiment of the invention, a second interlock switch interlocked with the power switch, which is turned on when the power switch of the vehicle body is turned off and turned off when the power switch is turned on, is installed between the negative terminal of the battery and the first negative input portion.

According to another embodiment of the invention, the vehicle-body charging connector is a female connector and the charger connector is a male connector.

According to another embodiment of the invention, the vehicle-body charging connector includes a first opening, a second opening, and a third opening into which the first positive output portion, the second positive output portion, and the negative output section of the charger connector are insertable. The positive input section, the first negative input portion, and the second negative input portion are placed on the innermost sides of the first opening, the third opening, and the second opening, respectively. A restriction member restricting the contact between the second negative input portion and the first negative input portion. The external conductor is installed around the inside of an inlet of each of the second opening and the third opening.

According to another embodiment of the invention, the restriction member can comprise an insulating member or spring member.

According to embodiments of the invention, there can be provided a charging system having a vehicle-body charging connector having a positive input section, a first negative input portion, and a second negative input portion connected to a positive terminal and a negative terminal of a battery installed in a vehicle body. A charger connector is connected to the vehicle-body charging connector and has a first positive output portion, a second positive output portion, and a negative input section connected to the positive input section, the second negative input portion, and the first negative input portion. The first positive output portion and the second positive output portion are connected to each other with a coil of a relay circuit installed in the charger body interposed therebetween. A normally opened relay switch of the relay circuit in which on and off operations are switched by the coil is connected to the first positive output portion. The power switch is turned off and the charger connector and the vehicle-body charging connector are connected to each other, and as a result, current from the battery is applied to the coil through the positive input section and the first positive output portion and the second negative input portion and the second positive output portion to turn on the normally opened relay switch. As a result, a charger body cannot supply power to the battery if a main switch is not turned off, thereby performing charging without special attention. Further, since an expensive change-over switch is not required and the normally opened relay switch is installed at the side of the charger which can be voltage-controlled, an inexpensive change-over switch can be adopted. The charging system can therefore be provided as an inexpensive system suitable for an inexpensive vehicle such as a two-wheeled vehicle. Since components having high voltage-resistance are provided at the side of the charger originally, the coil installed at the side of the charger body becomes a component having high voltage-resistance and the component having high voltage-resistance does not need to be provided at the side of the vehicle body, thereby providing the inexpensive charging system.

According to embodiments of the invention, since a cover section prevents contact between the positive input section and the negative input section, and an external conductor is mounted on the vehicle-body charging connector, current can be prevented from flowing on the external conductor.

According to embodiments of the invention, since the vehicle-body charging connector is installed obliquely downward in the vehicle body, it is difficult for the external conductor to contact the positive input section and the negative input section. This prevents current from flowing on the external conductor.

According to embodiments of the invention, a second interlock switch is interlocked with the power switch, which is turned on when the power switch of the vehicle body is turned off and turned off when the power switch is turned on. The second interlock switch can be installed between the negative terminal of the battery and the first negative input portion. Therefore current does not flow on the external conductor even though the external conductor contacts the positive input section and the negative input section when the power switch is turned on.

According to embodiments of the invention, the vehicle-body charging connector is a female connector; it is therefore difficult for the external conductor to contact the positive input section and the negative input section, thereby preventing current from flowing on the external conductor.

According to other embodiments of the invention, the vehicle-body charging connector includes a first opening, a second opening, and a third opening into which the first positive output portion, the second positive output portion, and the negative output section of the charger connector are insertable. The positive input section, the first negative input portion, and the second negative input portion are placed on the innermost sides of the first opening, the third opening, and the second opening, respectively. Restriction members restricting contact between the second negative input portion and the first negative input portion, and the external conductor are installed around the insides of inlets of the second opening and the third opening. The external conductor can therefore be prevented from contacting the positive input section and the negative input section, thereby preventing current from flowing on the external conductor.

BRIEF DESCRIPTION OF DRAWINGS

FIG. 6 is a diagram for describing the fixation structure of the motor shaft for the two-wheeled electric vehicle according to the second embodiment and FIG. 6A is a front view of stopper shown in FIG. 1.

FIG. 8 is a diagram showing structures of a swing arm and stopper of a first modified example.

FIG. 10 is a diagram showing the state where the swing arm of the first modified example is mounted on the stopper, and the motor shaft is fixed.

Embodiments of a wiring structure of a motor shaft of an electric vehicle, a fixation structure of the motor shaft of the electric vehicle, and a charging system according to the present invention will be described in detail below with reference to the accompanying drawings.

First Embodiment

Figure 1:
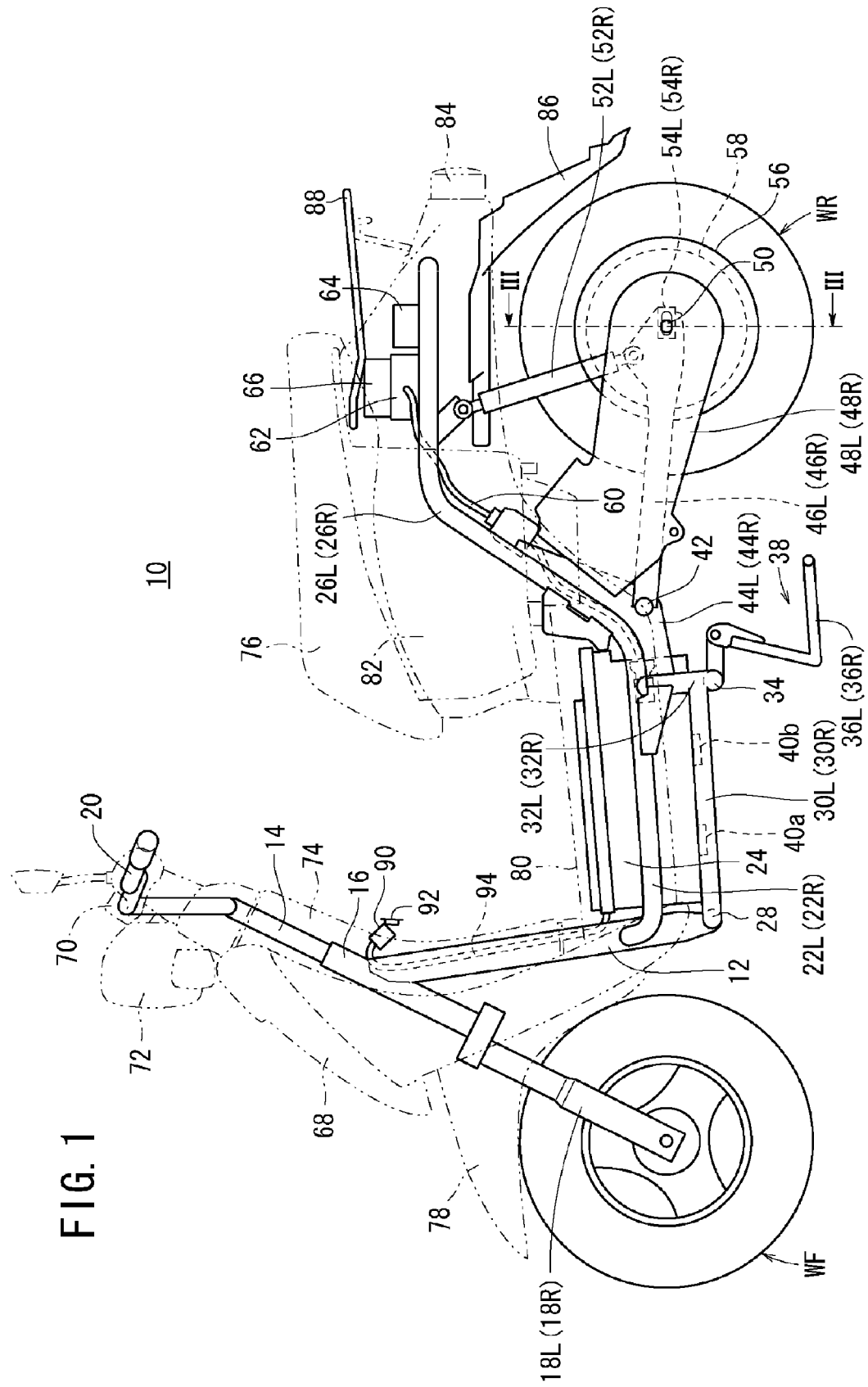
FIG. 1 is a side view of a two-wheeled electric vehicle according to a first embodiment.

FIG. 1 is a side view of a two-wheeled electric vehicle 10. Further, in the case of one mechanism or constituent member installed at each of the left and right sides of a vehicle body, 'L' is added to a reference sign of the left one and 'R' is added to a reference sign of the right one.

A head pipe 16 rotatably journaling a steering system 14 is coupled to the upper end of a main frame 12 of the two-wheeled electric vehicle 10. A pair of front forks 18L and 18R that rotatably journals a front wheel WF is mounted on the steering stem 14 and the front wheel WF is steerable by a handlebar 20 mounted in the upper part of the steering stem 14.

A pair of left and right upper-side frames 22L and 22R is connected to the lower part of the main frame 12 and the upper-side frames 22L and 22R are extended and curved obliquely downward therefrom and thereafter, extend backward. A 48 V electric battery 24 in which 12V battery modules are connected to each other in series is installed to be sandwiched between the left and right upper-side frames 22L and 22R. Rear frames 26L and 26R that are extended backward obliquely are connected to the upper-side frames 22L and 22R.

A lower cross front pipe 28 that is extended in a vehicle width direction is installed at the lower end of the main frame 12, downside frames 30L and 30R that are extended backward or horizontally are mounted on both ends of the lower cross front pipe 28, and brackets 32L and 32R that are extended in a vertical direction of a vehicle body are installed at rear ends of the downside frames 30L and 30R. The upper ends of the brackets 32L and 32R are connected to the upper-side frames 22L and 22R and both ends of a lower cross rear pipe 34 extending in the vehicle width direction are connected to the lower ends of the bracket 32L and 32R. A center stand 38 having two legs 36L and 36R that are separated from each other in the vehicle width direction is mounted on the lower cross rear pipe 34. Cross brackets 40a and 40b are installed to extend between the downside frames 30L and 30R and the cross brackets 40a and 40b support the battery 24.

Pivot plates 44L and 44R where a swing arm pivot 42 is formed are mounted at front portions of the rear frames 26L and 26R. Front ends of swing arms 46L and 46R act as axle supporters supporting a rear wheel WR, and are swingably journaled on the swing arm pivot 42, and the swing arms 46L and 46R are protected by arm covers 48L and 48R. An axle 50 is fixed to the rear parts of the swing arms 46L and 46R and the rear wheel WR is rotatably journaled by the axle 50. Rear shock units 52L and 52R are suspended on the rear frames 26L and 26R in upper rear parts of the swing arms 46L and 46R. Further, the axle 50 is a solid shaft. Further, stoppers or stopper means 54L and 54R for preventing displacement or coming off of the axle 50 fixed to the swing arms 46L and 46R are installed in the lower parts of the swing arms 46L and 46R.

A driving motor 58 for driving the two-wheeled electric vehicle 10 can be installed in a wheel 56 of the rear wheel WR. Driving motor 58 can be an in-wheel type motor. A power drive unit or PDU 62 transforming DC current supplied from the battery 24 through a power line 60 to 3-phase AC current and supplying the transformed AC current to the driving motor 58 can be installed above the rear shock units 52L and 52R. The 3-phase AC current, in this example, is supplied from the PDU 62 to the driving motor 58. A DC-DC converter 64 is installed in the rear part of the PDU 62. The DC-DC converter 64 converts the voltage of the battery 24 into voltage required to drive electronic equipment other than the driving motor 58 of the two-wheeled electric vehicle 10. An ECU 66 controlling each of the electronic equipment is installed in the upper part of the PDU 62, in addition to the PDU 62 and the DC-DC converter 64.

A front cover 68, as a part of a vehicle body cover covering the two-wheeled electric vehicle 10 is installed at a front side of the vehicle body of the handlebar 20 of the two-wheeled electric vehicle 10. A meter unit 70 including a speedometer as a part of the electronic equipment is mounted on the upper part of the front cover 68, and a headlamp 72 as a part of the electronic equipment is mounted at the front side of the vehicle body of the handlebar 20. A leg shield 74 connected with the front cover 68, as a part of a vehicle cover covering the two-wheeled electric vehicle 10 is installed at the rear side of the head pipe 16. The leg shield 74 covers the front side of the legs of a rider that sits on a seat 76 installed above the rear frames 26L and 26R.

A front fender 78 is installed above the front wheel WF and a step floor 80 connected with the lower part of the leg shield 74, configured to support legs of the rider that sits on the seat 76 is formed in the upper part of the battery 24. A seat cover 82 as a part of the vehicle body cover is installed outside the rear frames 26L and 26R and the seat 76 is installed in the upper part of the seat cover 82. A taillight device 84 as a part of the electronic equipment, a rear fender 86, and a loading platform 88 are mounted on the rear end of the seat cover 82.

Figure 2:
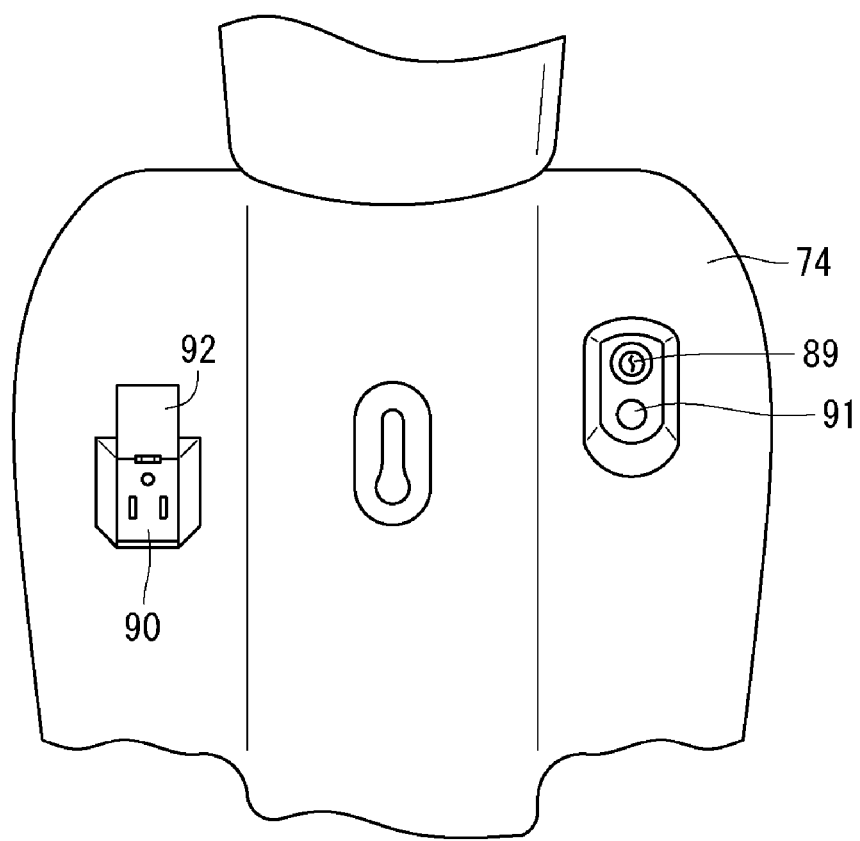
FIG. 2 is an enlarged diagram of a principal part of a leg shield of FIG. 1.

A vehicle-body charging connector 90 which is a female connector for connecting with a charger charging the battery 24 is installed at an opposite side to a power switch 89 at an upper left side of the leg shield 74 (see FIG. 2). The vehicle-body charging connector 90 is installed obliquely downward in the vehicle body. An opening into which a terminal of a male connector at the charger side is inserted is provided in the vehicle-body charging connector 90 and an inlet of the opening is formed obliquely downward in the vehicle body. A key hole into which a key is inputted is provided in the power switch 89 and a shutter key 91 which can close the key hole is installed below the power switch 89 at the upper left side of the leg shield 74.

A cover section 92 for preventing current from flowing on an external conductor by contacting the external conductor such as a human with the vehicle-body charging connector 90, is mounted on the vehicle-body charging connector 90. The battery 24 is connected with the vehicle-body charging connector 90 through the power line 94.

As a result, since the vehicle-body charging connector 90 is positioned above the leg shield 74 in front of the seat 76 on which the rider sits, even though the male connector at the charger side is easier to connect, unexpected contact is prevented by attaching the cover downward. Further, although the power switch 89 at the right side is continuously operated at the time of riding the vehicle, the vehicle-body charging connector 90 is positioned at the left side, and as a result, the operation of the power switch 89 is not interrupted, such that the power switch does not contact the vehicle-body charging connector 90.

Figure 3:
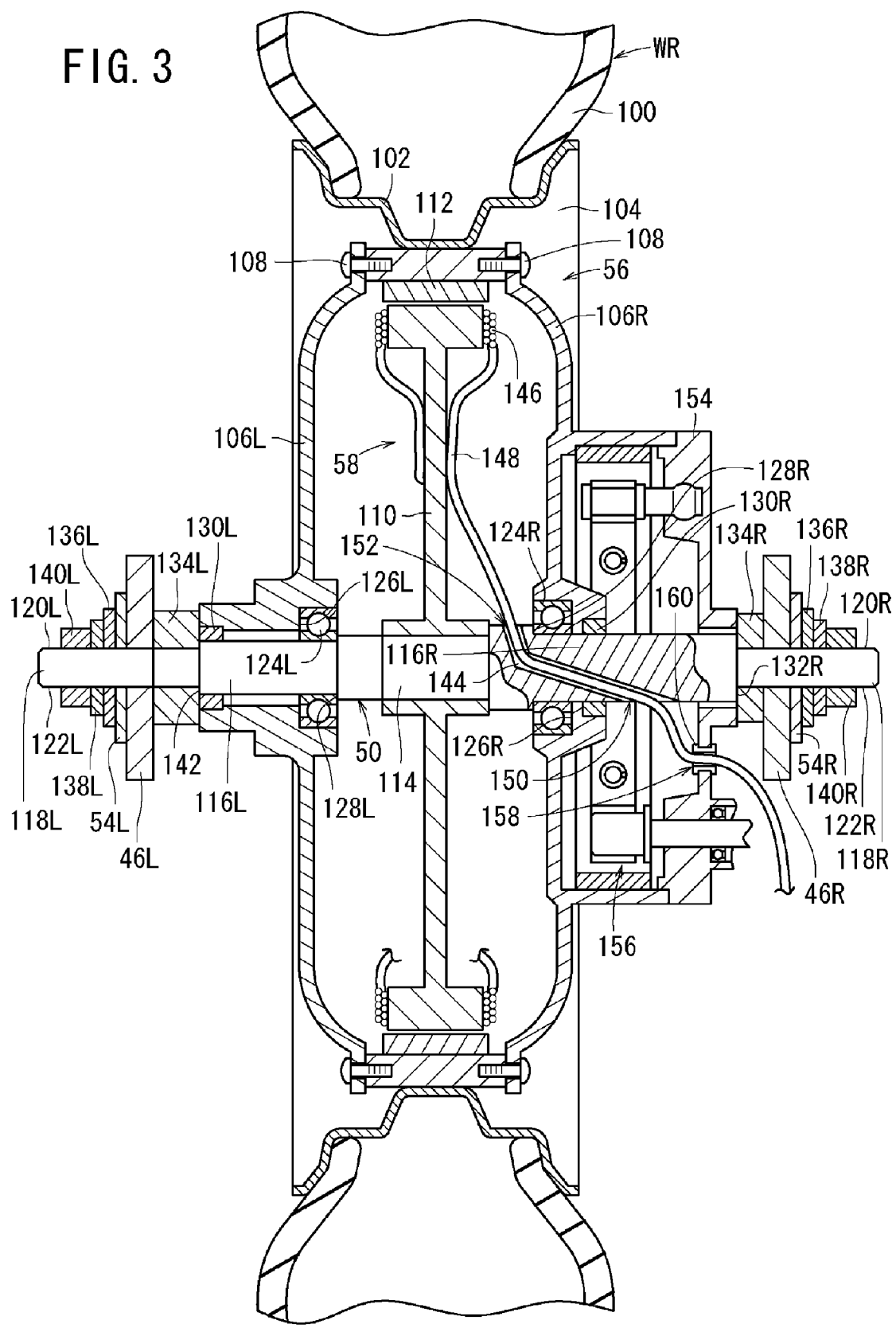
FIG. 3 is a partial cross-sectional view viewed in an arrow direction of line II-II of FIG. 1.

FIG. 3 is a partial cross-sectional view viewed in an arrow direction of line III-III of FIG. 1 and shows a wiring structure of the motor shaft 50 for the two-wheeled electric vehicle 10. The axle 50 is installed by penetrating the center of the rear wheel WR, such that the axle 50 journals the rear wheel WR and the swing arms 46L and 46R fix the axle from both sides.

The rear wheel WR is composed of a wheel 56 and a tire 100. The wheel 56 is a partition wheel that includes a body part 104 having a rim portion 102 holding the tire 100 and side parts 106L and 106R axially mounted at both sides of the body part 104. The body part 104 and the side parts 106L and 106R are fastened by a bolt 108.

The driving motor 58 can include a stator 110 as a stator and a rotor 112 as a rotor having a permanent magnet not shown. The stator 110 spline-fits in the axle 50 in the wheel 56, such that the axle 50 is a motor shaft of the driving motor 58. A portion of the axle 50, hereinafter, referred to as the motor shaft, that fits in the stator 110 is referred to as a fixation portion 114. The rotor 112 of the driving motor 58 is fixed to the inside of the rim portion 102 of the body part 104 of the wheel 56.

The motor shaft 50 can include side supporters 116L and 116R that rotatably journal the sides parts 106L and 106R at both sides of the fixation portion 114 and fastening portions 118L and 118R installed outside the side supporters 116L and 116R. The fixation portion 114 of the side supporter 116R is composed of a cylinder having a first diameter and the fastening portion 118R is composed of a cylinder having a second diameter smaller than the first diameter. The side supporter 116L is composed of a cylinder having a third diameter. The fastening portions 118L and 118R are used to fasten the motor shaft 50 to the vehicle body by the swing arms 46L and 46R. Threads are formed at the fastening portions. A pair of fastening surfaces substantially parallel to a cylindrical member in a forward-backward direction of the vehicle body and the vehicle width direction is formed at the fastening portions 118L and 118R. Reference signs 120L and 120R represent upper fastening surfaces and reference signs 122L and 122R represent lower fastening surfaces.

Bearings or rotatable supporting members 124L and 124R are installed between the side parts 106L and 106R and the motor shaft 50. As a result, the side supporters 116L and 116R may rotatably journal the motor shaft 50, such that the wheel 56 is rotatable with respect to the motor shaft 50. The bearings 124L and 124R are fixed by being allowed to abut on side-part butting portions 126L and 126R formed in the side parts 106L and 106R and motor-shaft butting portions 128L and 128R formed on the motor shaft 50.

Since the butting portion 128L is formed by the difference between the diameter of the fixation portion 114 and the diameter of the side supporter 116L, the diameter of the butting portion 128L is larger than the diameter (third diameter) of a place where the bearing 124L is installed. Since the butting portion 128R is formed by the cylinder having the first diameter and the cylinder having the second diameter in the side supporter 116R, the diameter of the butting portion 128R is equivalent to the first diameter and is larger than the diameter (second diameter) of a place where the bearing 124R is installed.

Further, sealing members 130L and 130R are installed between the side parts 106L and 106R and the motor shaft 50. The sealing members 130L and 130R are installed outside the direction of the motor shaft 50 of the side parts 106L and 106R and the bearings 124L and 124R are installed inside the direction of the motor shaft 50 of the side parts 106L and 106R.

A collar 134R abuts on the butting portion 132R composed of the side supporter 116R and the fastening portion 118R. In addition, the swing arm 46R is installed at the fastening portion 118R of the motor shaft 50 by being allowed to abut on the collar 134R and the stopper 54R, a rotation preventer 136R, a washer 138R, and a nut or fixation member 140R are installed in sequence further axially outside the swing arm 46R.

Meanwhile, a collar 134L abuts on the butting portion 142 composed of the side supporter 116L and the fastening portion 118L. In addition, the swing arm 46L is installed at the fastening portion 118L of the motor shaft 50 by being allowed to abut on the collar 134L and the stopper 54L, a rotation preventer 136L, a washer 138L, and a nut or fixation member 140L are installed in sequence more further axially outside than the swing arm 46L.

By the nuts 140L and 140R, the rear wheel WR comprising the tire 100, the wheel 56, and the driving motor 58 is mounted on the swing arms 46L and 46R through the motor shaft 50, such that the rear wheel WR is mounted on the vehicle body. When the nut 140R is tightened, the swing arm 46R is tightened between the nut 140R and the butting portion 132R of the motor shaft 50, and as a result, force generated by tightening the nut 140R is not applied to the wheel 56. Further, when the nut 140L is tightened, the swing arm 46L is tightened between the nut 140L and the butting portion 142 of the motor shaft 50, and as a result, force generated by tightening the nut 140L is not applied to the wheel 56.

A through-hole 144 is formed to wire-connect the stator 110 at the right side of the axle 50 toward the front of the vehicle body. The through-hole 144 for passing a wire 148 that supplies power to a coil 146 of the stator 110 is formed at the right side of the motor shaft 50. A wiring inlet 150 of the through-hole 144 is formed outside the direction of the motor shaft 50 of the side part 106R and a wiring outlet 152 of the through-hole 144 is formed inside the direction of the motor shaft 50 of the side part 106R. Specifically, the wiring inlet 150 is formed further outside the direction of the motor shaft 50 than the sealing member 130R and the wiring outlet 152 is formed further inside the direction of the motor shaft 50 than the butting portion 128R. The through-hole 144 of the motor shaft 50 is formed in the upward-downward or vertical direction of the vehicle body and a lower opening of the through-hole 144 is made to serve as the wiring inlet 150 and an upper opening of the through-hole 144 is made to serve as the wiring outlet 152.

Marks for verifying the position are put on the upper fastening surfaces 120L and 120R. As a result, by setting the motor shaft 50 with the marks positioned at the upper side, the wiring outlet 152 of the through-hole 144 can be set to be the upper side and a direction of fixing the motor shaft 50 will not be mistaken at the time of fixing the motor shaft 50 to the swing arms 46L and 46R.

A brake panel 154 is installed in the right side part 106R toward the front of the vehicle body and a brake drum 156 for braking is installed in a space formed by the side part 106R and the brake panel 154. The brake drum 156 is installed at the side of the brake panel 154. An insertion hole 158 into which the wire 148 can be inserted is formed in the brake panel 154 and a grommet 160 as a waterproof member is provided in the insertion hole 158. The wire 148 is inserted into the through-hole 144 through the insertion hole 158 and the space formed by the side part 106R and the brake panel 154, and is connected to the stator 110 of the driving motor 58.

As described above, the through-hole 144 is formed further inside than an axial end of the motor shaft 50 and inside the swing arms 46L and 46R and the wire 148 passes through the through-hole 144, and as a result, a particular cover does not need to be installed with respect to a high-voltage wire in the driving motor 58, thereby protecting the wire 148 from damage which could be caused by a human such as a rider, or other damage source, in a simple structure.

The insertion hole 158 into which the wire 148 can be inserted is formed in the brake panel 154, the wire 148 is inserted into the through-hole 144 by passing the insertion hole 158, and the grommet 160 is installed in the insertion hole 158, thereby preventing water from permeating into the driving motor 58.

Since the through-hole 144 is formed at the right side toward the front of the vehicle body, the rider does not stand or sit near the side of the through-hole 144 (the right side), such that the rider is not affected by the high-voltage wire. Further, in areas where the vehicle keeps to the left such as in Japan, the through-hole 144 is installed at the right side toward the front of the vehicle body. In areas where the vehicle typically keeps to the right, the through-hole 144 is installed at the left side toward the front of the vehicle body.

Since the wiring inlet 150 of the through-hole 144 is positioned below the motor shaft 50 and the wiring outlet 152 of the through-hole 144 is positioned above the motor shaft 50, even when it is rainy or the two-wheeled electric vehicle 10 is submerged, water can be prevented from permeating into the driving motor 58.

Further, in the embodiment, although the driving motor 58 is installed in the wheel 56 of the rear wheel WR, the driving motor 58 may be installed in the wheel 56 of the front wheel WF. In this case, the axle supporters are the front forks 18L and 18R.

Figure 4:
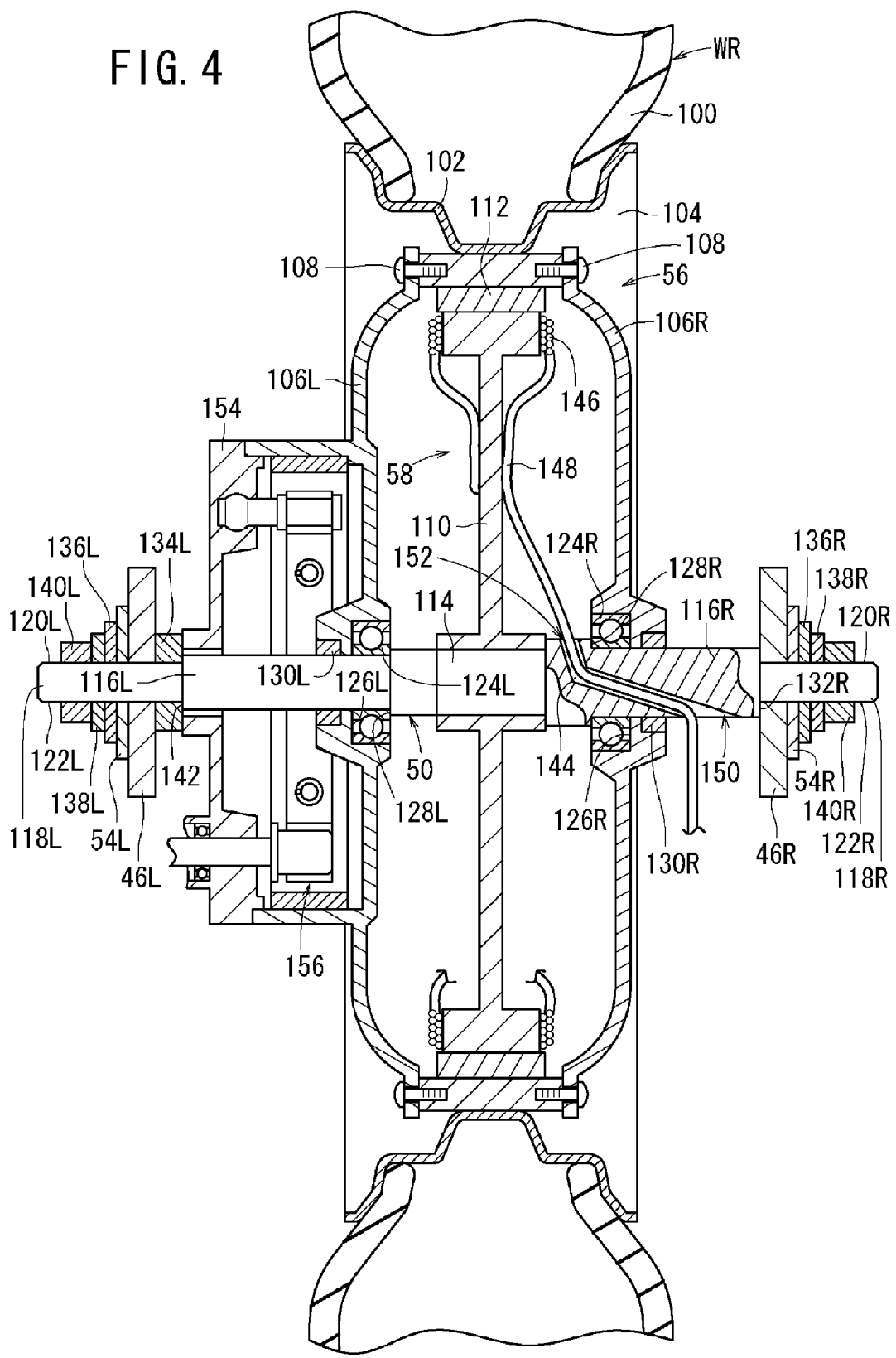
FIG. 4 is a cross-sectional view viewed in an arrow direction of line II-II of FIG. 1 when a brake drum is installed at the left side toward the front side of a vehicle body.

Further, in the embodiment, although in this example, the brake drum 156 is installed at the right side toward the front of the vehicle body, the brake drum may be formed at the left side toward the front of the vehicle body. FIG. 4 is a cross-sectional view viewed in an arrow direction of line II-II of FIG. 1 when the brake drum 156 is installed at the left side toward the vehicle body.

Second Embodiment

Figure 5:
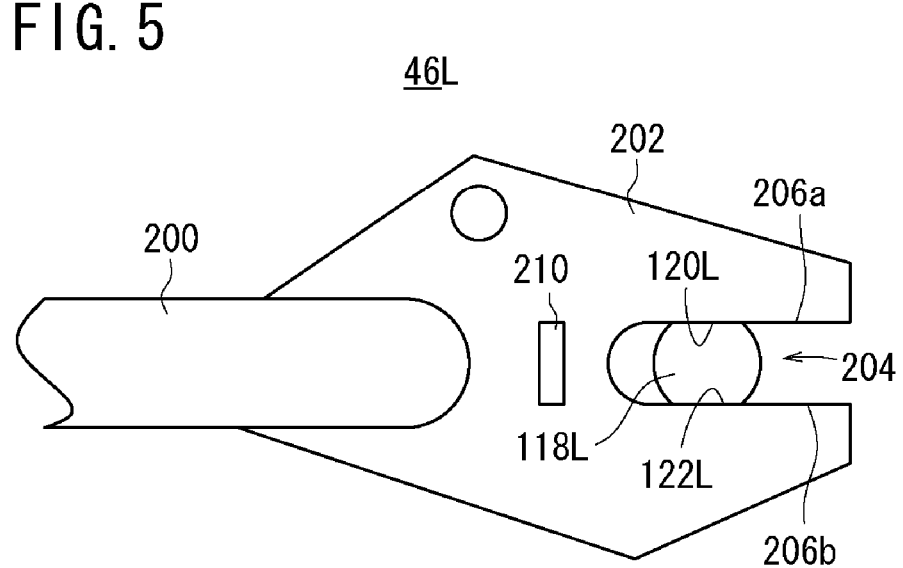
FIG. 5 is a diagram for describing a fixation structure of a motor shaft for a two-wheeled electric vehicle according to a second embodiment and an enlarged diagram of a principal part of a swing arm shown in FIG. 1.
Figure 6A:
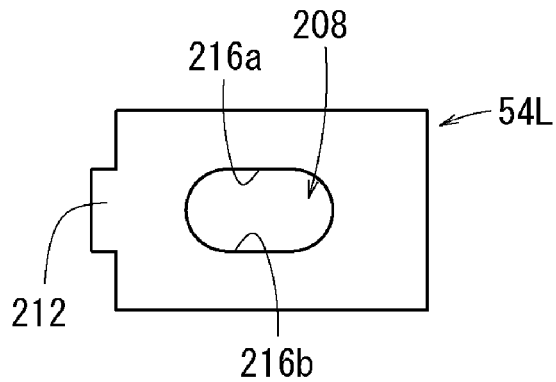
Figure 6B:
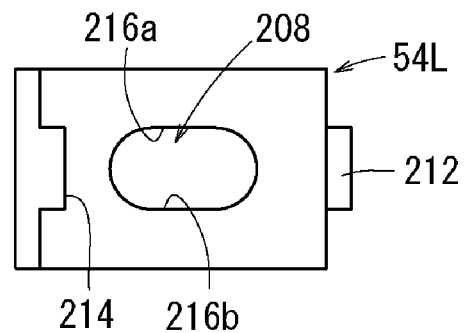
FIG. 6B is a rear view of the stopper shown in FIG. 1.
Figure 6C:
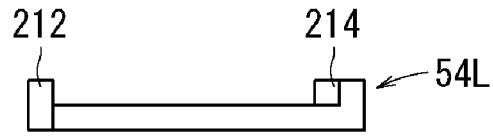
FIG. 6C is a plan view of the stopper shown in FIG. 1.

Subsequently, the fixation structure of the motor shaft 50 for the two-wheeled electric vehicle 10 will be described. FIG. 5 is an enlarged diagram of a principal part of the swing arm 46L shown in FIG. 1 and FIG. 6 is a diagram showing the stopper 54L shown in FIG. 1. FIG. 6A is a front view of the stopper 54L, FIG. 6B is a rear view of the stopper 54L, and FIG. 6C is a plan view of the stopper 54L.

The fastening portion 118L of the motor shaft 50 is used to be fastened to the vehicle body side by the nut 140L and as described above, the fastening portion has an upper fastening surface 120L and a lower fastening surface 122L. The fastening surfaces 120L and 122L are parallel to each other in the forward-backward direction of the vehicle body. The swing arm 46L includes an arm portion 200 and an end piece portion 202. An engagement aperture 204 that restricts rotation (turning) of the motor shaft 50 according to the shape of the fastening portion 118L and is opened toward the rear side of the vehicle body is formed in the end piece portion 202. Width-direction sides 206a and 206b of the engagement aperture 204 are a pair of sides which are parallel to each other in the forward-backward direction of the vehicle body. The width-direction sides contact the fastening surfaces 120L and 122L when the fastening portion 118L is inserted into the engagement aperture 204. Since the fastening portion 118L has the fastening surfaces 120L and 122L, the swing arm 46L can receive rotary reaction force of the motor shaft 50 at the sides 206a and 206b of the engagement aperture 204 and the fastening force of the nut 140L tightening the fastening portion 118L can be maintained.

The stopper 54L includes a through-portion 208 into which the fastening portion 118L is inserted, a first engagement portion 212 that engages with a first fit-in hole 210 formed in the swing arm 46L, and a fit-in portion 214 that fits in an opened portion in the rear of the vehicle body of the engagement aperture 204. Width-direction sides 216a and 216b of the through-portion 208 are a pair of sides which are parallel to each other in the forward-backward direction of the vehicle body. The width-direction sides contact the fastening surfaces 120L and 122L when the fastening portion 118L is inserted into the through-portion 208.

After the motor shaft 50 is inserted from the rear side of the engagement aperture 204 of the swing arm 46L, the stopper 54L is mounted on the end piece portion 202 of the swing arm 46L to prevent the motor shaft 50 from being displaced or coming off. Further, since the fit-in portion 214 is position-adjusted with respect to the swing arm 46L of the stopper 54L, the stopper 54L may be mounted on the swing arm 46L accurately.

Figure 7:
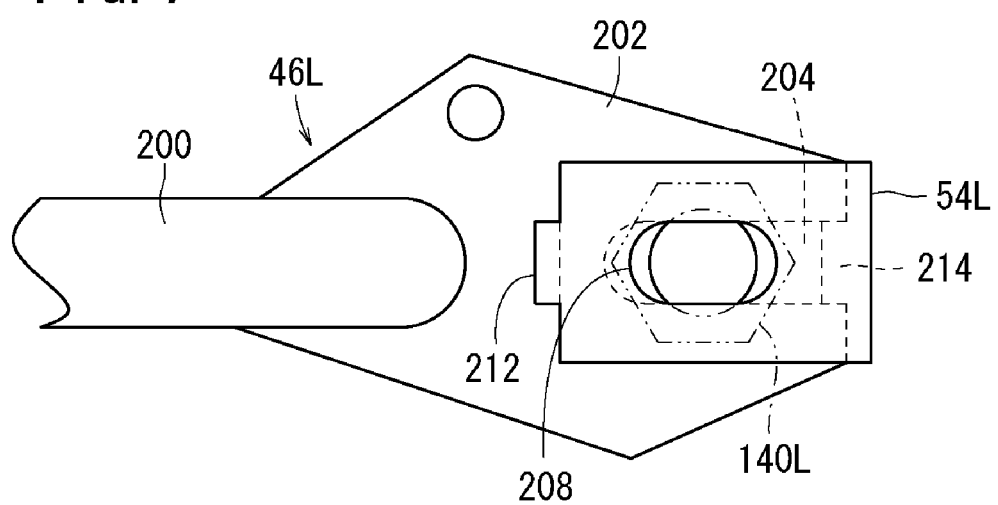
FIG. 7 is a diagram showing the state where the stopper shown in FIG. 6 is mounted on the swing arm shown in FIG. 5 and the motor shaft is fixed.

FIG. 7 is a diagram showing the state where the motor shaft 50 is fixed by mounting the stopper 54L on the swing arm 46L. As shown in FIG. 7, since the fastening portion 118L of the motor shaft 50 is inserted into the engagement aperture 204 of the swing arm 46L and the through-portion 208 of the stopper 54L, although the nut 140L is loose, the movement of the motor shaft 50 is restrained by the through-portion 208 to prevent the motor shaft 50 from coming off from the swing arm 46L. Further, the size of the through-portion 208 is the same as the shape of the fastening portion 118L of the motor shaft 50 to prevent the motor shaft 50 from being displaced.

As described above, before the nut 140L is mounted after the motor shaft 50 is inserted from the rear side of the engagement aperture 204 of the swing arm 46L, while the first engagement portion 212 of the stopper 54L is engaged with the first fit-in hole 210 of the swing arm 46L, the motor shaft 50 is inserted into the through-portion 208, the fit-in portion 214 fits in the opened portion in the rear of the vehicle body of the engagement aperture 204, and the nut 140L is only tightened to fix the motor shaft 50 so as to prevent the motor shaft 50 from coming off from the swing arm 46L and the motor shaft 50 from being rotated (turned) in a simple structure.

Further, since a pair of fastening surfaces 120L and 122L is provided at the fastening portion 118L, rotational force actuated by the motor shaft 50 using the rotary reaction force applied to the stator 110 of the driving motor 58 is effectively received by the engagement aperture 204 and the through-portion 208 contacting the fastening surfaces 120L and 122L to maintain the fastening force of the nut 140L and even if the nut 140L is loose, the motor shaft 50 can be fixed without coming off from the swing arm 46L by using the stopper 54L which is inexpensive and has a simple structure.

Further, the second embodiment may be modified as below.

Figure 8A:
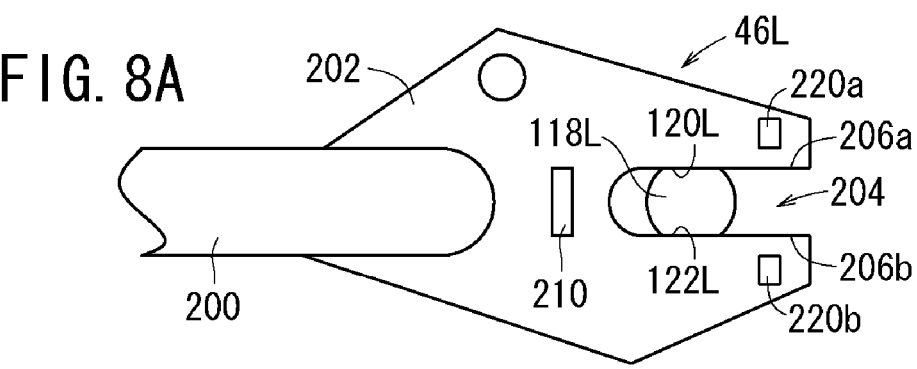
FIG. 8A is an enlarged diagram of a principal art of the swing arm of the first modified example.
Figure 8B:
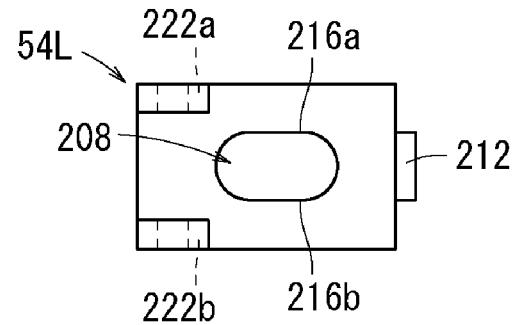
FIG. 8B is a rear view of the stopper of the first modified example.
Figure 8C:
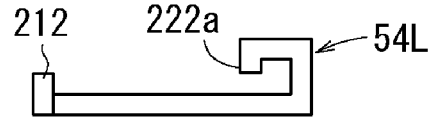
FIG. 8C is a plan view of the stopper of the first modified example.

FIG. 8 is a diagram showing structures of a swing arm 46L and a stopper 54L of a first modified example, FIG. 8A is an enlarged diagram of a principal art of the swing arm 46L of the first modified example, FIG. 8B is a rear view of the stopper 54L of the first modified example, and FIG. 8C is a plan view of the stopper 54L of the first modified example. The same reference signs refer to the same components as the second embodiment.

The stopper 54L includes the through-portion 208 into which the fastening portion 118L is inserted, and the first engagement portion 212 that engages with the first fit-in hole 210 formed in the swing arm 46L and further includes second engagement portions 222a and 222b that engage with the second fit-in holes 220a and 220b formed in the swing arm 46L. The first engagement portion 212 engages with the first fit-in hole 210 from the outer surface of the swing arm 46L and the second engagement portions 222a and 222b engage with the second fit-in holes 220a and 220b from the inner surface of the swing arm 46L. The second engagement portions 222a and 222b adjust the position of the stopper 54L with respect to the swing arm 46L.

Figure 9:
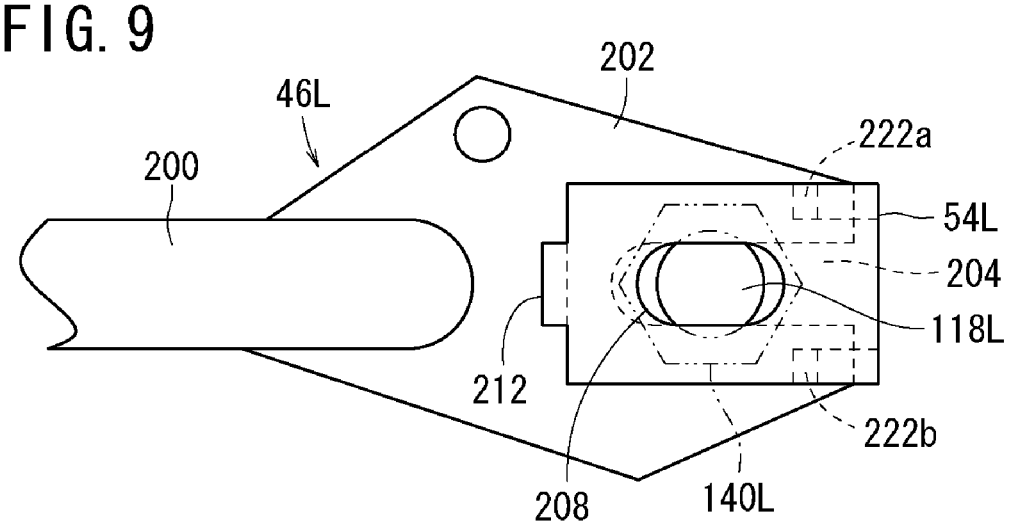
FIG. 9 is a diagram showing the state where the swing arm is mounted on the stopper of the first modified example and a motor shaft is fixed.

First, before the nut 140L is mounted after the motor shaft 50 is inserted from the rear side of the engagement aperture 204 of the swing arm 46L, while the second engagement portions 222a and 222b of the stopper 54L engage with the second fit-in holes 220a and 220b of the swing arm 46L, the motor shaft 50 is inserted into the through-portion 208 and the first engagement portion 212 engages with the first fit-in hole 210 to tighten the nut 140L. The stopper 54L in the first modified example is mounted on the swing arm 64L and the motor shaft 50 is fixed. The fixation state is shown in FIG. 9. As a result, since the motor shaft 50 does not come off from the swing arm 46L, the motor shaft 50 can be fixed in a simple structure.

Figure 10A:
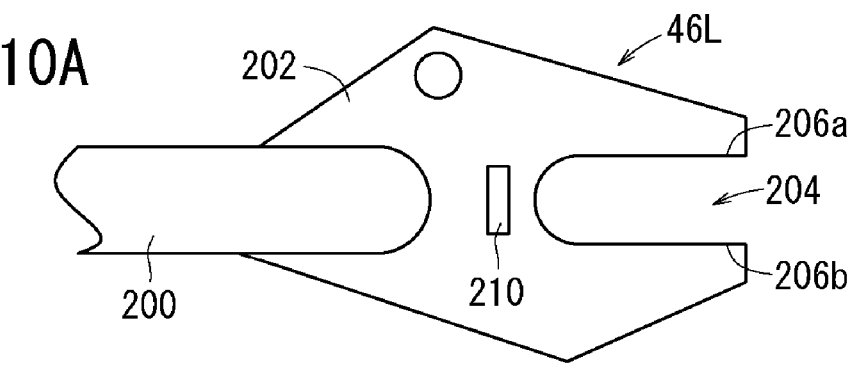
FIG. 10A is an enlarged diagram of a principal art of a swing arm of a second modified example.
Figure 10B:
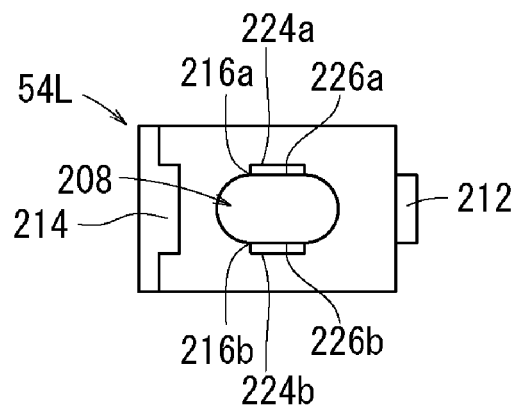
FIG. 10B is a rear view of a stopper of the second modified example.
Figure 10C:
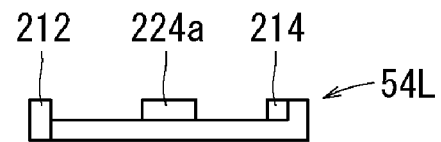
FIG. 10C is a plan view of the stopper of the second modified example.

FIG. 10 is a diagram showing structures of a swing arm 46L and a stopper 54L of a second modified example, FIG. 10A is an enlarged diagram of a principal art of the swing arm 46L of the second modified example, FIG. 10B is a rear view of the stopper 54L of the second modified example, and FIG. 10C is a plan view of the stopper 54L of the second modified example. The same reference signs refer to the same components as the second embodiment.

In this example, the stopper 54L includes the through-portion 208 into which the fastening portion 118L is inserted, the first engagement portion 212 that engages with the first fit-in hole 201 formed in the swing arm 46L, and the fit-in portion 214 that fits-in the rear opened portion of the vehicle body at the engagement aperture 204 and further includes a pair of extension portions 224a and 224b that are extended toward the motor shaft 50 when the stopper 54L is mounted on the swing arm 46L and contact the fastening surfaces 120L and 122L of the fastening portion 118L. The pair of extension portions 224a and 224b has contact surfaces 226a and 226b that substantially contact the fastening surfaces 120L and 122L and the contact surfaces 226a and 226b are positioned on the same plane as the sides 216a and 216b.

First, before the nut 140L is mounted after the motor shaft 50 is inserted from the rear side of the engagement aperture 204 of the swing arm 46L, while the first engagement portion 212 of the stopper 54L engages with the first fit-in hole 210 of the swing arm 46L, the motor shaft 50 is inserted into the through-portion 208 by inserting the extension portions 224a and 224b into the engagement aperture 204 so that the fastening portion 118L is sandwiched between the engagement portion and the first fit-in hole and the fit-in portion 214 engages with the rear opened portion of the vehicle body at the engagement aperture 204 to tighten the nut 140L. Further, in the second modified example, the opening width of the engagement aperture 204, which is the distance between the sides 206a and 206b of the engagement aperture 204, is longer than the thickness between the fastening surfaces 120L and 122L of the fastening portion 118L.

Figure 11:
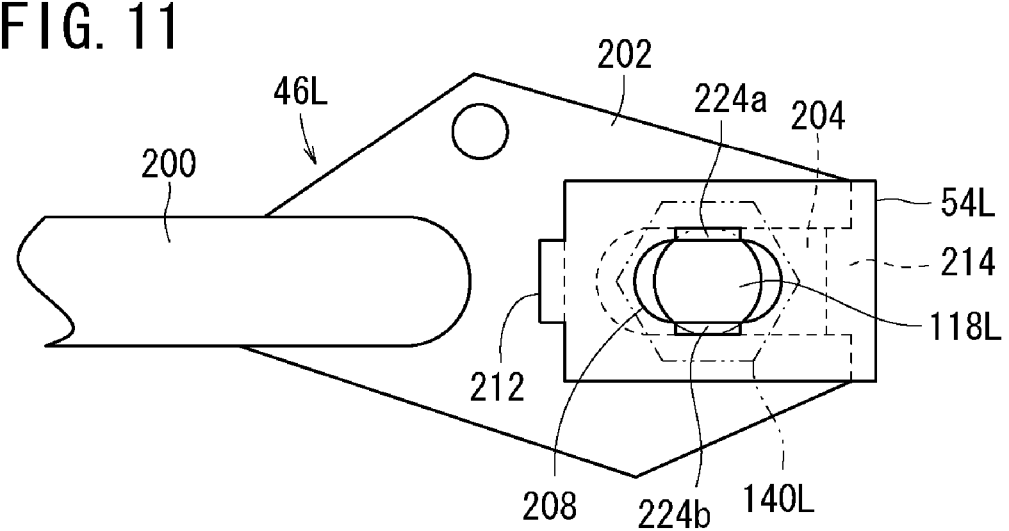
FIG. 11 is a diagram showing the state where the stopper of the second modified example is mounted on the stopper and the motor shaft is fixed.

FIG. 11 is a diagram showing the state where the stopper 54L is mounted on the swing arm 46L and the motor shaft 50 is fixed in the second modified example. As shown in FIG. 11, the fastening portion 118L of the motor shaft 50 is inserted into the engagement aperture 204 of the swing arm 46L and the through-portion 208 of the stopper 54L and sandwiched by the pair of extension portions 224a and 224b. In this case, the contact surfaces 226a and 226b of the pair of extension portions 224a and 224b substantially contact the fastening surfaces 120L and 122L of the fastening portion 118L. As a result, in addition to the effect in the second embodiment, since the rotary reaction force generated on the motor shaft 50 can be received by the pair of extension portions 224a and 224b, contact pressure of a part subjected to the rotary reaction force generated on the motor shaft 50 can be reduced and further, the rigidity of the part subjected to the rotary reaction force can be increased.

Further, in the second embodiment, since the rotary reaction force generated on the motor shaft 50 is received by the sides 206a and 206b of the engagement aperture 204a and the sides 216a and 216b of the through-portion 208, an area subjected to the rotary reaction force generated on the motor shaft 50 depends on the thickness of the swing arm 46L and the thickness of the stopper 54L and as the thicknesses decrease, the contact pressure increases. Further, in order to increase the rigidity of the part subjected to the rotary reaction force generated on the motor shaft 50, the rigidity of each of the entire end piece portion 202 of the swing arm 46L and the stopper 54L needs to be increased, thereby requiring high cost.

Figure 12:
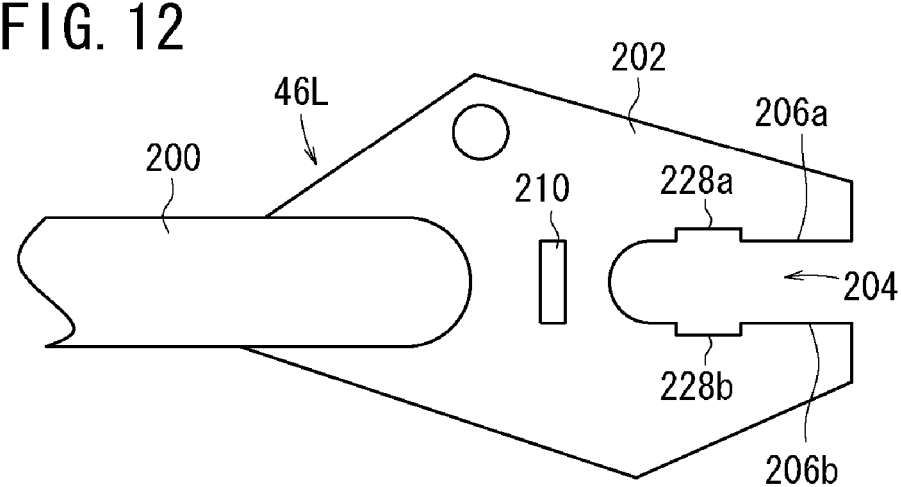
FIG. 12 is an enlarged diagram of a principal part of a swing arm of a third modified example.

The end piece portion 202 of the swing arm 46L of the second modified example may be modified as below. FIG. 12 is an enlarged diagram of a principal part of a swing arm 46L of a third modified example. In the third modified example, the stopper 54L described in the second modified example is used. The same reference signs refer to the same components as the second embodiment.

The engagement aperture 204 has a pair of recessed portions 228a and 228b which the pair of extension portions 224a and 224b of the stopper 54L fits in. The depths of the pair of recessed portions 228a and 228b are equivalent to the thicknesses of the extension portions 224a and 224b.

Figure 13:
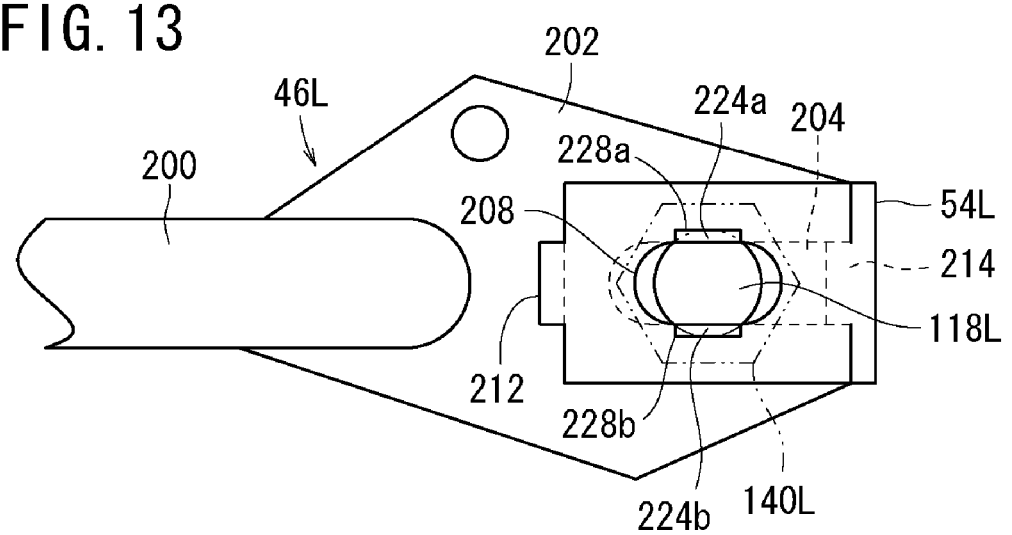
FIG. 13 is a diagram showing the state where stopper is mounted on the swing arm of the third modified example and a motor shaft is fixed.

FIG. 13 is a diagram showing the state where the stopper 54L is mounted on the swing arm 46L and the motor shaft 50 is fixed in the third modified example. As shown in FIG. 13, the fastening portion 118L of the motor shaft 50 is inserted into the engagement aperture 204 of the swing arm 46L and the through-portion 208 of the stopper 54L and sandwiched by the pair of extension portions 224a and 224b. In this case, the pair of extension portions 224a and 224b fits in the recessed portions 228a and 228b of the engagement aperture 204 and the contact surfaces 226a and 226b of the pair of extension portions 224a and 224b substantially contact the fastening surfaces 120L and 122L of the fastening portion 118L.

As a result, in addition to the effect in the second embodiment, since the rotary reaction force generated on the motor shaft 50 can be received by the pair of extension portions 224a and 224b, contact pressure of a part subjected to the rotary reaction force generated on the motor shaft 50 can be reduced and further, the rigidity of the part subjected to the rotary reaction force can be increased.

Further, when the pair of extension portions 224a and 224b fit in the recessed portions 228a and 228b of the engagement aperture 204, the sides 206a and 206b without the recessed portions 228a and 228b of the engagement aperture 204 and the contact surfaces 226a and 226b of the pair of extension portions 224a and 224b are positioned on the same plane. Accordingly, even when the fastening portion 118L is displaced from places where the extension portions 224a and 224b are formed, the sides 206a and 206b of the engagement aperture 204 contact the fastening surfaces 120L and 122L of the fastening portion 118L, and as a result, the sides 206a and 206b of the engagement aperture 204 can receive the rotary reaction force generated on the motor shaft 50, thereby maintaining the fastening force of the nut 140L. Further, since the extension portions 224a and 224b fit in the recessed portions 228a and 228b, it is easy to position the stopper 54L with respect to the swing arm 46L.

Further, in the second embodiment and the first to third modified examples, the fixation of the fastening portion 118L of the motor shaft 50 has been described by using the swing arm 46L and the stopper 54L, but since the fixation of the fastening portion 118R is also the same, the description thereof will be omitted. That is, the fastening portion 118R can be fixed by using the swing arm 46L and the stopper means 54R having the same function as the stopper 54L.

Third Embodiment

Figure 14:
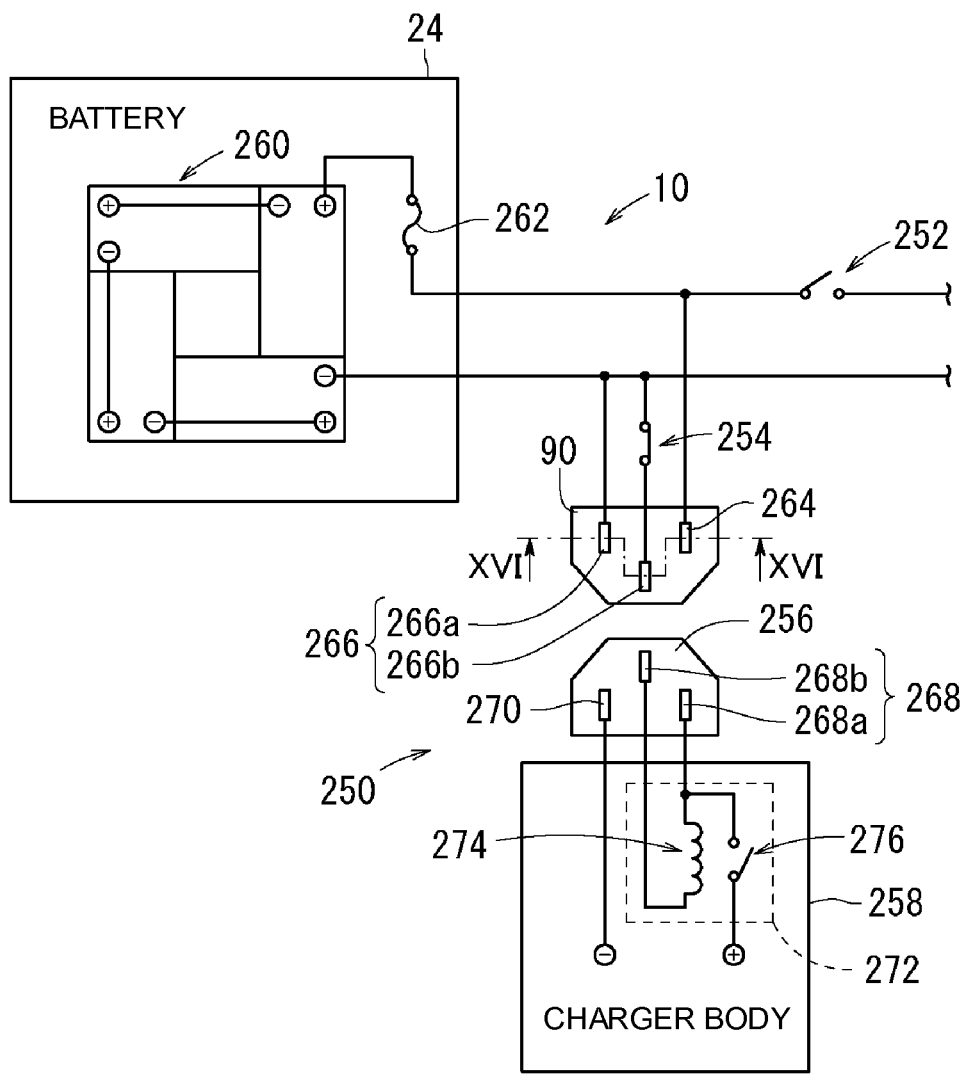
FIG. 14 is a diagram showing an electrical configuration of a charging system of a third embodiment.

Subsequently, FIG. 14 is a diagram showing an electrical configuration of a charging system of a two-wheeled electric vehicle 10 and a charger 250. The two-wheeled electric vehicle 10 includes a battery 24, a vehicle-body charging connector 90 which is a female connector, a power switch 252 of the two-wheeled electric vehicle 10, and an interlock switch 254. The charger 250 includes a charger connector 256 which is a male connector and a charger body 258.

The battery 24 can include a battery pack 250 in which 12 V battery modules are connected in series and a fuse 262 connected to the positive terminal of the battery pack 260. The power switch 252 is connected to a positive terminal of the battery 24.

The vehicle-body charging connector 90 includes a positive input section 264 connected to the positive terminal of the battery 24 and a negative input section 266 connected to a negative terminal of the battery 24. The negative input section 266 includes a first negative input portion 266a and a second negative input portion 266b. The interlock switch 254 is a switch that is installed between the negative terminal of the battery 24 and the second negative input portion 266b, and interlocks with the power switch 252 that is turned on when the power switch 252 is turned off and turned off when the power switch 252 is turned on.

The charger connector 256 includes a positive output section 268 connected to a positive terminal of the charger body 258 and a negative output section 270 connected to a negative terminal of the charger body 258. The positive output section 268 includes a first positive output portion 268a connected to the positive input section 264 and a second positive output portion 268b connected to the second negative input portion 266b. Further, the negative output section 270 is connected to the first negative input portion 266a.

A relay circuit 272 is installed between the first positive output portion 268a and the second positive output portion 268b, and the positive terminal of the charger body 258. The relay circuit 272 includes a coil (relay coil) 274 and a relay switch (normally opened relay switch) 276. The first positive output portion 268a and the second positive output portion 268b are connected to each other with the coil 274 interposed therebetween and the relay switch 276 is installed between the first positive output portion 268a and the positive terminal of the charger body 258.

In the charging system having the above configuration, when the power switch 252 is turned off while the charger connector 256 is connected to the vehicle-body charging connector 90, the interlock switch 254 is turned on. When the interlock switch 254 is turned on, current from the battery 24 is applied to the coil 274 through the positive input section 264 and the first positive output portion 268a and the negative input portion 266b and the second positive output portion 268b. That is, current flows on the coil 274 through the positive input section 264 and the first positive output portion 268a and the current that flows through the second positive output portion 268b and the second negative input portion 266b returns to the battery 24. As a result, the coil 274 is excited to turn on the relay switch 276. As the relay switch 276 is turned on, power from the charger body 258 is supplied to the battery 24 through the charger connector 256 and the vehicle-body charging connector 90, and as a result, the battery 24 is charged. Further, when the power switch 252 is turned on, the interlock switch 254 is turned off and no current flows on the coil 274. Therefore, when the power switch 252 is turned on, the relay switch 276 is turned off, such that the battery 24 is not charged.

As described above, since the charging cannot be performed if the power switch 252 of the two-wheeled electric vehicle 10 is not turned off, the charging can be performed without paying a special attention. Further, since an expensive change-over switch is not required, the relay switch 276 is installed at the side of the charger 250 which can be voltage-controlled, and as a result, an inexpensive change-over switch may be adopted and the charging system can be provided as an inexpensive system suitable for an inexpensive vehicle such as a two-wheeled vehicle. Since components having high voltage-resistance are provided at the side of the charger originally, the coil 274 installed at the side of the charger body 258 becomes a component having high voltage-resistance and the component having high voltage-resistance does not need to be provided at the side of the vehicle body, thereby providing the inexpensive charging system.

Further, by using the vehicle-body charging connector 90 as the female connector, it is difficult for an external conductor such as a human finger to come in contact with the positive input section 264 and the first negative input portion 266a or the second negative input portion 266b, thereby preventing current from flowing on the external conductor.

Further, if the charger connector 256 is not connected to the vehicle-body charging connector 90 of which the power switch 252 is turned off, the relay switch 276 is not turned on, and as a result, even when the first positive output portion 268a or the second positive output portion 268b of the charger connector 256 and the negative output section 270 contact the external conductor, no current flows on the external conductor.

Further, the third embodiment may be modified as below.

Figure 15:
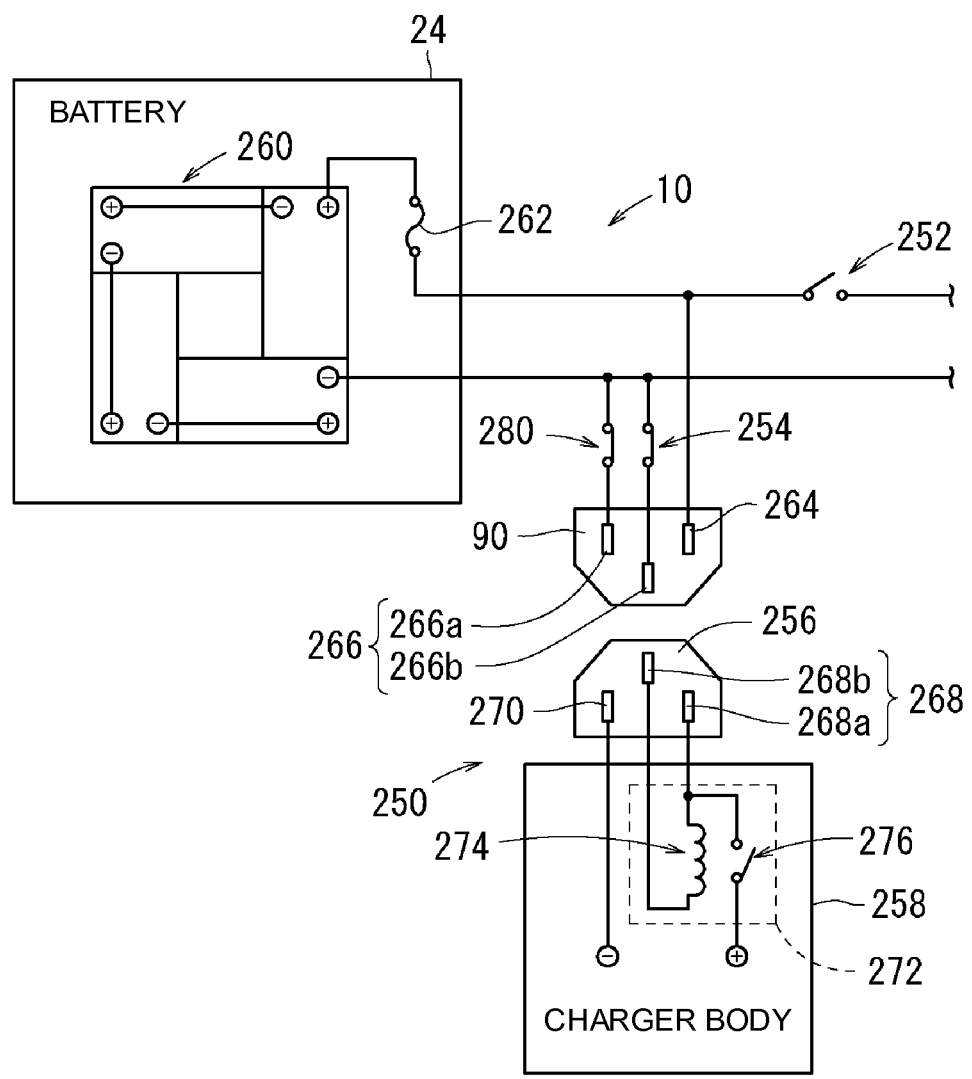
FIG. 15 is a diagram showing an electrical configuration of a charging system of the first modified example.

FIG. 15 is a diagram showing an electrical configuration of a charging system of the first modified example. The same reference signs refer to the same components as the third embodiment.

In the first modified example, the interlock switch 254 is installed between the negative terminal of the battery 24 and the second negative input portion 266b and further, an interlock switch (second interlock switch) 280 is installed also between the negative terminal of the battery 24 and the first negative input portion 266a.

In the third embodiment, the positive input section 264 and the negative terminal of the battery 24 are normally connected to each other and the first negative input portion 266a and the negative terminal of the battery 24 are normally connected to each other. Therefore, when the external conductor contacts the positive input section 264 and the first negative input portion 266a, current flows on the external conductor.

However, in the first modified example, since the interlock switch 280 is installed also between the negative terminal of the battery 24 and the first negative input portion 266a, the negative terminal of the battery 24 is electrically interrupted from the first negative input portion 266a and the second negative input portion 266b when the power switch 252 is turned on, and as a result, even when the external conductor contacts the positive input section 264 and the first negative input portion 266a or the second negative input portion 266b, the current can be prevented from flowing on the external conductor.

Further, the interlock switch 280 may be installed between the positive terminal of the battery 24 and the positive input section 264. Even in this case, the current can be prevented from flowing on the external conductor when the power switch 252 is turned on.

Figure 16:
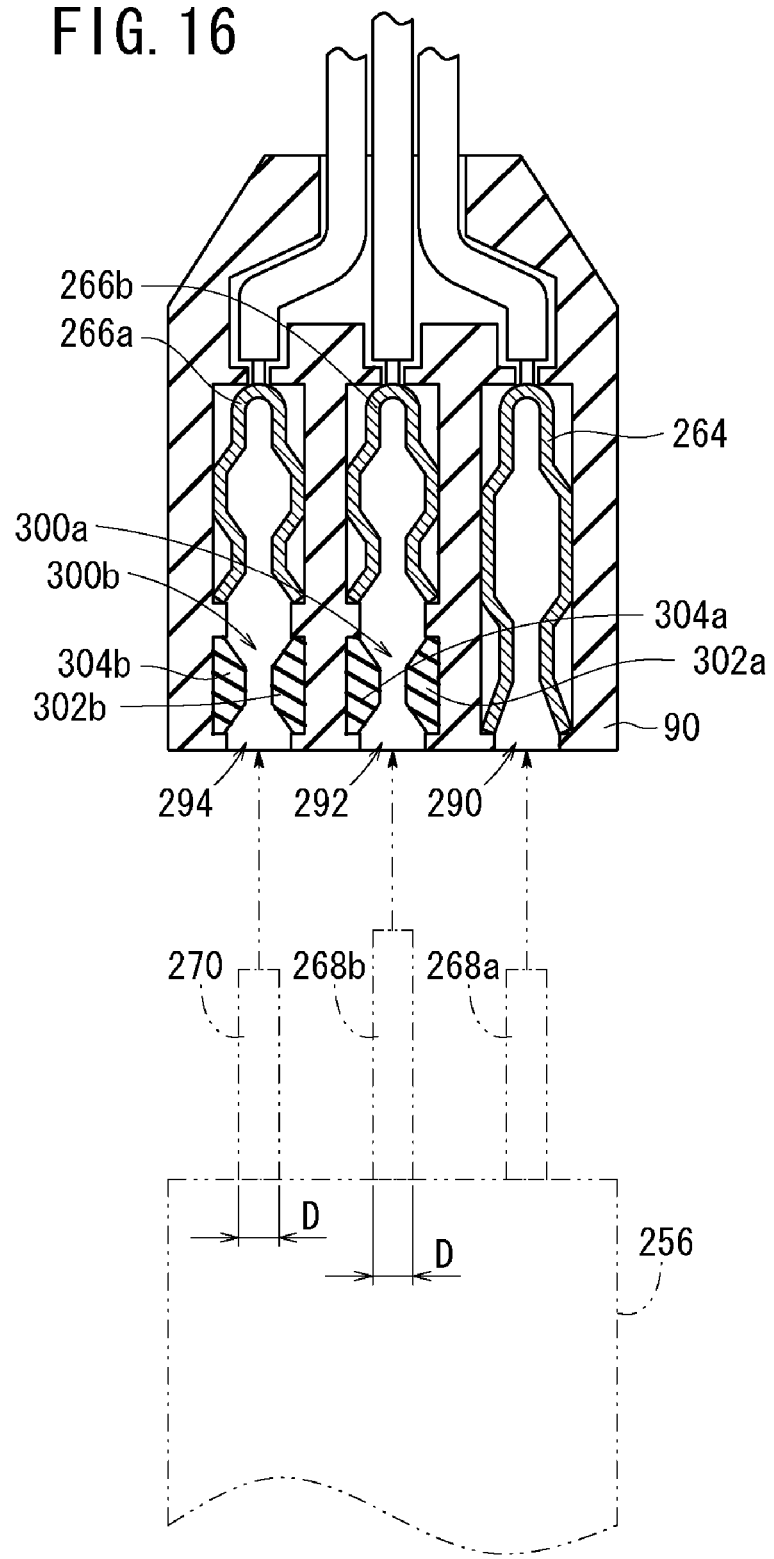
FIG. 16 is a diagram showing one example of a cross section viewed in an arrow direction of line XVI-XVI of a charging connector at a vehicle body side shown in FIG. 14 of the second modified example.

FIG. 16 is a diagram showing one example of a cross section viewed in an arrow direction of line XVI-XVI of the vehicle-body charging connector 90 shown in FIG. 14. Further, the same reference signs refer to the same components as the third embodiment.

The vehicle-body charging connector 90 includes the first positive output portion 268a of the charger connector 256, and a first opening 290, a second opening 292, and a third opening 294 into which the second positive output portion 268b and the negative output section 270 can be inserted.

The positive input section 264 of the vehicle-body charging connector 90, the first negative input portion 266a, and the second negative input portion 266b are placed on the innermost sides of the first opening 290, the third opening 294, and the second opening 292, respectively.

Restriction members 300a and 300b restricting the contact between the external conductor and the second negative input portion 266b and the first negative input portion 266a are installed around the insides of inlets of the second opening 292 and the third opening 294. That is, the restriction member 300a is installed between the second opening 292 and the second negative input portion 266b and the restriction member 300b is installed between the third opening 294 and the first negative input portion 266a.

The restriction members 300a and 300b can be resin or elastic members (e.g., rubber) and include first members 302a and 302b and second members 304a and 304b that are spaced apart from each other, respectively. The spacing distances between the first members 302a and 302b and the second members 304a and 304b are shorter than the thicknesses D of the second positive output portion 268b and the negative output section 270. The restriction members 300a and 300b have friction resistance with respect to the second positive output portion 268b and the negative output section 270 inserted into the second opening 292 and the third opening 294.

Accordingly, as long as the charger connector 256 is not connected to the vehicle-body charging connector 90 according to a user's intention, the first positive output portion 268a, the second positive output portion 268b, and the negative output section 270 are not connected to the positive input section 264, the second negative input portion 266b, and the first negative input portion 266a. As a result, the vehicle-body charging connector 90 and the charger connector 256 are not connected to each other.

As described above, since the restriction members 300a and 300b are installed between the second negative input portion 266b and the first negative input portion 266a and the second opening 292 and the third opening 294, the possibility that the external conductor will contact the first negative input portion 266a or the second negative input portion 266b is decreased, thereby preventing current from flowing on the external conductor.

Further, the restriction members 300a and 300b are not installed around the insides of the inlets of the second opening 292 and the third opening 294. The restriction member 300 (300a or 300b) may be installed between the positive input section 264 and the first opening 290, for example around the inside of an inlet of the first opening 290.

Figure 17:
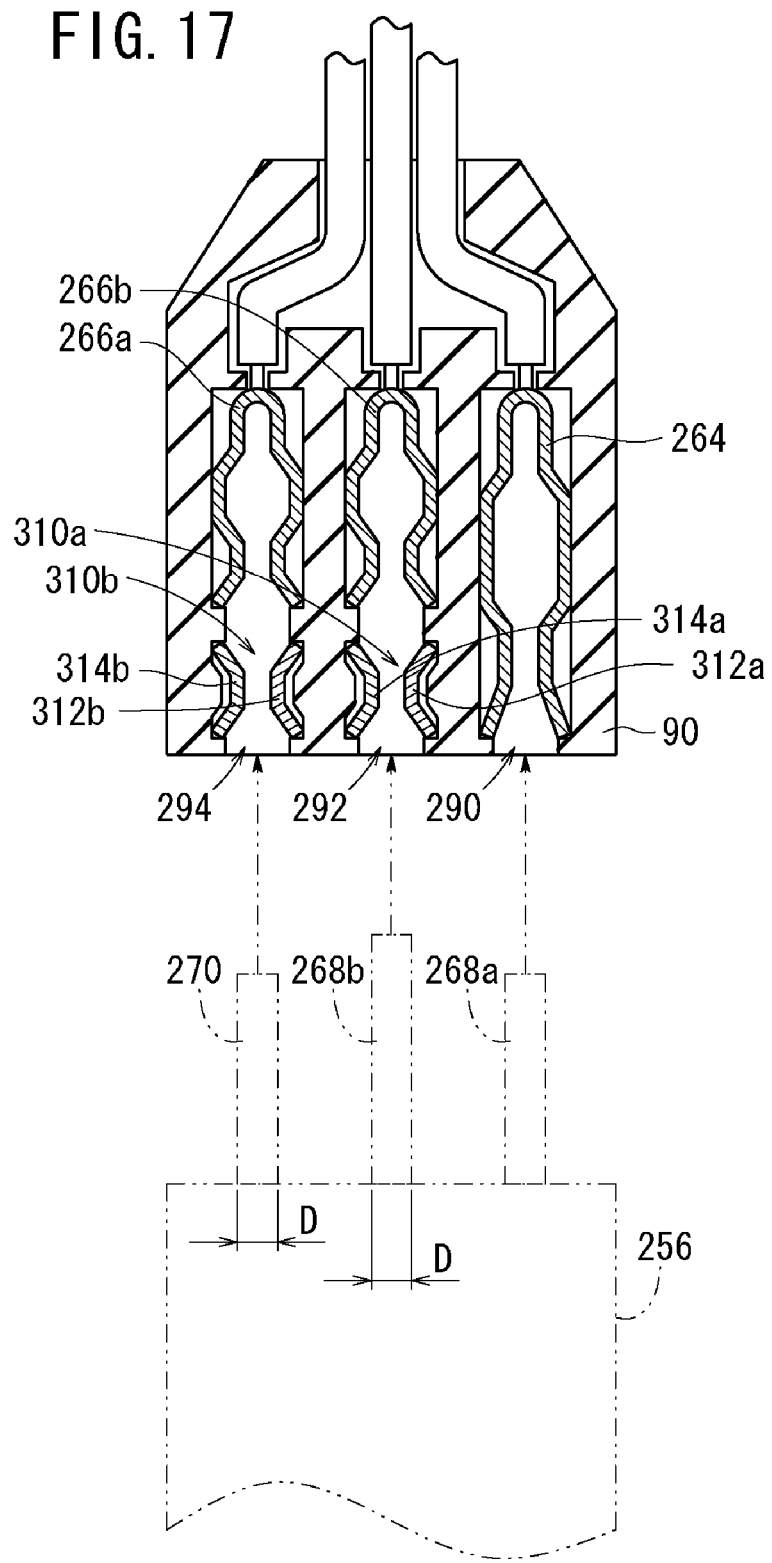
FIG. 17 is a diagram showing another example of the cross section viewed in the arrow direction of line XVI-XVI of a vehicle-body charging connector shown in FIG. 14 of the second modified example.

FIG. 17 is a diagram showing another example of the cross section viewed in the arrow direction of line XVI-XVI of the vehicle-body charging connector 90 shown in FIG. 14. Further, the same reference signs refer to the same components as the components shown in FIG. 16.

Restriction members 310a and 310b restricting contact between the external conductor and the second negative input portion 266b and the first negative input portion 266a are installed around the inside of the inlets of the second opening 292 and the third opening 294. That is, the restriction member 310a is installed between the second opening 292 and the second negative input portion 266b and the restriction member 310b is installed between the third opening 294 and the first negative input portion 266a.

The restriction members 310a and 310b can be spring members and include first members 312a and 312b and second members 314a and 314b that are spaced apart from each other, respectively. The first members 312a and 312b and the second members 314a and 314b may be elastic members such as coned disc springs and may be made of metal. The spacing distances between the first members 312a and 312b and the second members 314a and 314b are shorter than the thicknesses D of the second positive output portion 268b and the negative output section 270. The restriction members 310a and 310b have friction resistance with respect to the second positive output portion 268b and the negative output section 270 inserted into the second opening 292 and the third opening 294.

Accordingly, as long as the charger connector 256 is not connected to the vehicle-body charging connector 90 according to a user's intention, the first positive output portion 268a, the second positive output portion 268b, and the negative output section 270 are not connected to the positive input section 264, the second negative input portion 266b, and the first negative input portion 266a. As a result, the vehicle-body charging connector 90 and the charger connector 256 are not connected to each other.

As described above, since the restriction members 310a and 310b are installed between the second negative input portion 266b and the first negative input portion 266a and the second opening 292 and the third opening 294, the possibility that the external conductor will contact the first negative input portion 266a or the second negative input portion 266b is further decreased, thereby preventing current from flowing on the external conductor.

Further, the restriction members 310a and 310b are not installed around the insides of the inlets of the second opening 292 and the third opening 294, but the restriction member 310 (310a or 310b) may be installed between the positive input section 264 and the first opening 290, for example around the inside of the inlet of the first opening 290.

In the second modified example, the restriction member 300a is installed between the second opening 292 and the second negative input portion 266b and the restriction member 300b is installed between the third opening 294 and the first negative input portion 266a, but in the third modified example, the restriction members is installed between the first opening 290 and the negative input section 264.

Figure 18:
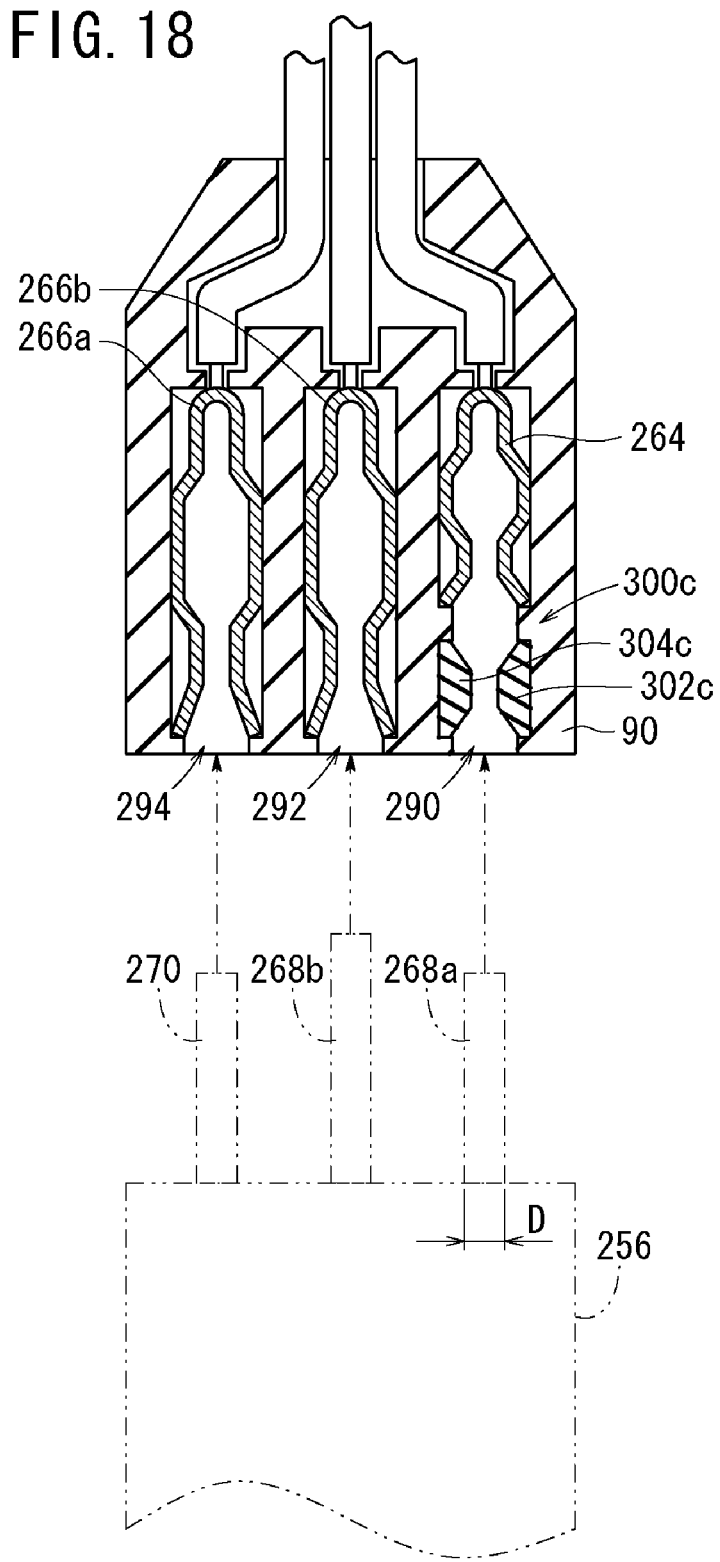
FIG. 18 is a diagram showing one example of a cross section viewed in the arrow direction of line XVI-XVI of the vehicle-body charging connector shown in FIG. 14 of the third modified example.

FIG. 18 is a diagram showing one example of a cross section viewed in the arrow direction of line XVI-XVI of the vehicle-body charging connector 90 shown in FIG. 14 of the third modified example. Further, the same reference signs refer to the same components as the components shown in FIG. 16.

A restriction member 300c restricting the contact between the external conductor and the positive input section 264 is installed around the inside of the inlet of the first opening 290. That is, the restriction member 300c is installed between the first opening 290 and the positive input section 264. The restriction member 300c is the resin or elastic member (e.g., rubber) and includes a first member 302c and a second member 304c that are spaced apart from each other. The spacing distance between the first member 302c and the second member 304c is shorter than the thickness D of the first positive output portion 268a and the restriction member 300c has friction resistance with respect to the first positive output portion 268a inserted into the first opening 290.

Accordingly, as long as the charger connector 256 is not connected to the vehicle-body charging connector 90 according to the user's intention, the first positive output portion 268a, the second positive output portion 268b, and the negative output section 270 are not connected to the positive input section 264, the second negative input portion 266b, and the first negative input portion 266a, and as a result, the vehicle-body charging connector 90 and the charger connector 256 are not connected to each other.

As described above, since the restriction member 300c is installed between the positive input section 264 and the first opening 290, the possibility that the external conductor will contact the positive input section 264 is further decreased, thereby preventing current from flowing on the external conductor.

Further, the restriction members 300a, 300b, and 300c may be installed around the insides of all the inlets of the second opening 292, the third opening 294, and the first opening 290.

Figure 19:
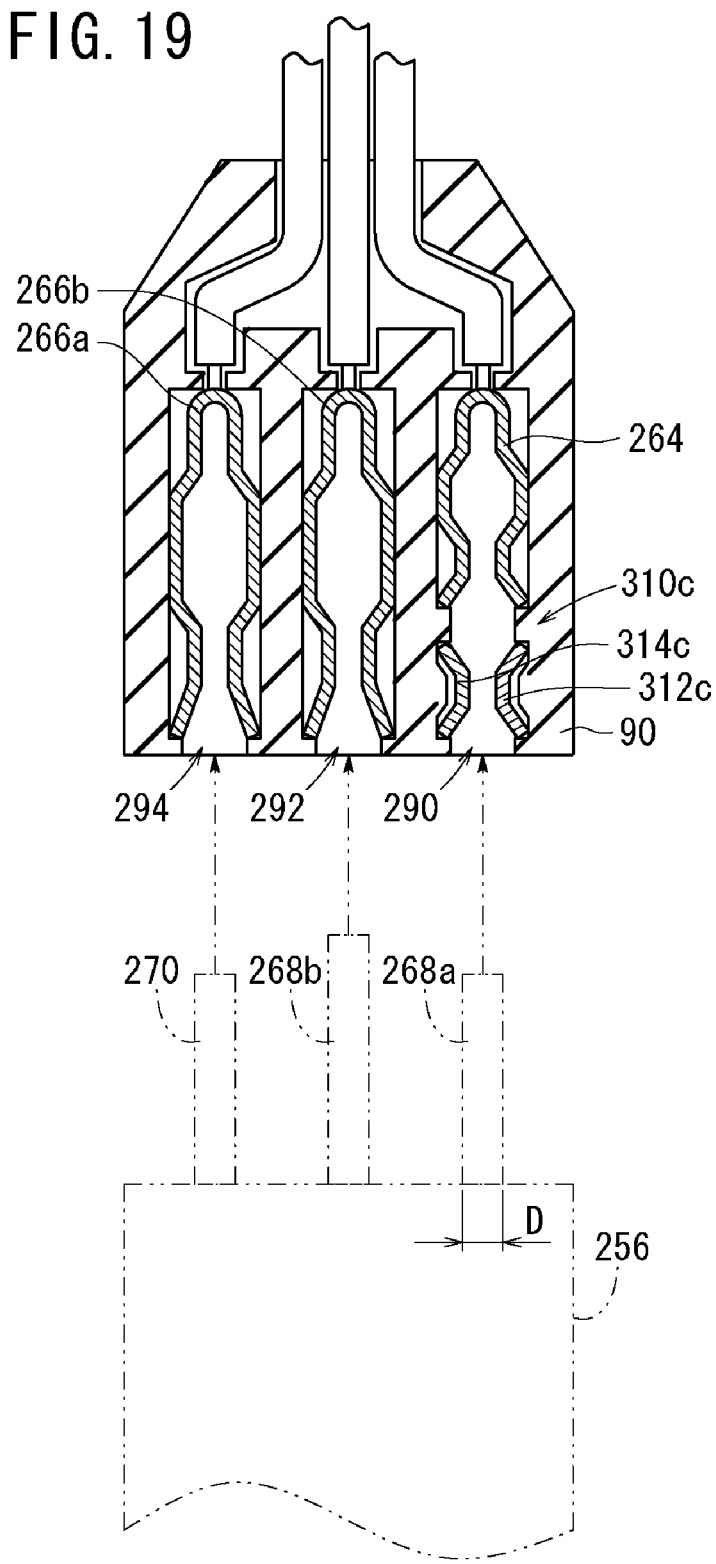
FIG. 19 is a diagram showing another example of the cross section viewed in the arrow direction of line XVI-XVI of the vehicle-body charging connector shown in FIG. 14 of the third modified example.

FIG. 19 is a diagram showing another example of a cross section viewed in the arrow direction of line XVI-XVI of the vehicle-body charging connector 90 shown in FIG. 14 of the third modified example. Further, the same reference signs refer to the same components as the components shown in FIG. 17.

A restriction member 310c restricting the contact between the external conductor and the positive input section 264 is installed around the inside of the inlet of the first opening 290. That is, the restriction member 310c is installed between the first opening 290 and the positive input section 264. The restriction member 310c is the spring member and includes a first member 312c and a second member 314c that are spaced apart from each other. The first member 312c and the second member 314c may be the elastic member such as the coned disc spring and may be made of metal. The spacing distance between the first member 312c and the second member 314c is shorter than the thickness D of the first positive output portion 268a and the restriction member 310c has friction resistance with respect to the first positive output portion 268a inserted into the first opening 290.

Accordingly, as long as the charger connector 256 is not connected to the vehicle-body charging connector 90 according to the user's intention, the first positive output portion 268a, the second positive output portion 268b, and the negative output section 270 are not connected to the positive input section 264, the second negative input portion 266b, and the first negative input portion 266a. As a result, the vehicle-body charging connector 90 and the charger connector 256 are not connected to each other.

As described above, since the restriction member 310c is installed between the positive input section 264 and the first opening 290, the possibility that the external conductor will contact the positive input section 264 is further decreased, thereby preventing current from flowing on the external conductor.

Further, the restriction members 310a, 310b, and 310c may be installed around the inside of all the inlets of the second opening 292, the third opening 294, and the first opening 290. Further, a charging starting/stopping switch is installed at the side of the charger body 258 and after the batteries 24 installed in the charger 250 and the vehicle are connected (after the charger connector 256 and the vehicle-body charging connector 90 are connected), the charging may be started by using the switch installed at the side of the charger 250.

Although the present invention has been described by using appropriate embodiments, the technical scope of the present invention is not limited to the scope described in the embodiments. It is apparent to those skilled in the art that various changes or modifications of the embodiments can be made. It is apparent based on the appended claims that even the embodiments in which the changes or modifications can be made may be included in the technical scope of the present invention. Further, reference signs in parentheses disclosed in appended claims are given according to reference signs in the accompanying drawings for ease of appreciation of the present invention and the present invention is not analyzed to be limited to components to which the reference signs are given.

REFERENCE SIGNS LIST

10 . . . Two-wheeled electric vehicle
18L, 18R . . . Front fork
24 . . . Battery
46L, 46R . . . Swing arm
50 . . . Motor shaft (axle)
54L, 54R . . . Stopper
56 . . . Wheel
58 . . . Driving motor
90 . . . Vehicle-body charging connector
92 . . . Cover section
100 . . . Tire
102 . . . Rim portion
104 . . . Body part
106L, 106R . . . Side part
110 . . . Stator
112 . . . Rotor
114 . . . Fixation portion
116L, 116R . . . Side supporter
118L, 118R . . . Fastening portion
120L, 120R . . . Fastening surface
124L, 124R . . . Bearing
126L, 126R, 128L, 128R, 132, 142 . . . Butting portion
140L, 140R . . . Nut
144 . . . Through-hole
146, 274 . . . Coil
148 . . . Wire
150 . . . Wiring inlet
152 . . . Wiring outlet
154 . . . Brake panel
156 . . . Brake drum
158 . . . Insertion hole
160 . . . Grommet
200 . . . Arm portion
202 . . . End piece portion
204 . . . Engagement aperture
208 . . . Through-portion
210 . . . First fit-in hole
212 . . . First engagement portion
214 . . . Fit-in portion
220a, 220b . . . Second fit-in hole
222a, 222b . . . Second engagement portion
224a, 224b . . . Extension portion
226a, 226b . . . Contact surface
228a, 228b . . . Recessed portion
250 . . . Charger
252 . . . Power switch
254, 280 . . . Interlock switch
256 . . . Charger connector
258 . . . Charger body
264 . . . Positive input unit
266 . . . Negative input unit
266a . . . First negative input portion
266b . . . Second negative input portion
268 . . . Positive output unit
268a . . . First positive output portion
268b . . . Second positive output portion
270 . . . Negative output unit
272 . . . Relay circuit
276 . . . Relay switch
290 . . . First opening
292 . . . Second opening
294 . . . Third opening
300a, 300b, 310a, 310b . . . Restriction member
302a, 302b, 312a, 312b . . . First member
304a, 304b, 314a, 314b . . . Second member

The invention claimed is:

1. A charging system, comprising:
   a charger connector having a positive output section and a negative output section;
   a charger body;
   vehicle-body charging connector having a positive input section and a negative input section configured to be connected to a positive terminal and a negative terminal of a battery installed in a vehicle body,
   wherein the negative input section includes a first negative input portion and a second negative input portion and a first interlock switch interlocked with a power switch, wherein the first interlock switch is configured to be turned on when the power switch of the vehicle body is turned off and turned off when the power switch is turned on, the first interlock switch being disposed between the negative terminal of the battery and the second negative input portion,
   wherein the positive output section includes a first positive output portion connected to the positive input section and a second positive output portion connected to the second negative input portion, the first positive output portion and the second positive output portion being connected to each other with a coil of a relay circuit installed in the charger body interposed therebetween, and a normally opened relay switch of the relay circuit in which on and off operations are switched by the coil is connected to the first positive output portion, and
   wherein when the power switch is turned off and the charger connector and the vehicle-body charging connector are connected to each other, current from the battery is applied to the coil through the positive input section and the first positive output portion and the second negative input portion and the second positive output portion to turn on the normally opened relay switch.

2. The charging system according to claim 1,
   wherein a cover section, configured to prevent contact between the positive input section and the negative input section, and an external conductor, is disposed on the vehicle-body charging connector.

3. The charging system according to claim 1,
   wherein the vehicle-body charging connector is disposed obliquely downward in the vehicle body at a left side of a leg shield disposed in front of a seat.

4. The charging system according to claim 1,
   wherein a second interlock switch interlocked with the power switch, which is configured to be turned on when the power switch of the vehicle body is turned off and turned off when the power switch is turned on, is disposed between the negative terminal of the battery and the first negative input portion.

5. The charging system according to claim 1,
   wherein the vehicle-body charging connector comprises a female connector and the charger connector comprises a male connector.

6. The charging system according to claim 5,
   wherein the vehicle-body charging connector includes a first opening, a second opening, and a third opening into which the first positive output portion, the second positive output portion, and the negative output section of the charger connector are insertable,
   wherein the positive input section, the first negative input portion, and the second negative input portion are disposed on innermost sides of the first opening, the third opening, and the second opening, respectively; and
   wherein a restriction member, configured to restrict contact between the second negative input portion and the first negative input portion, and the external conductor is disposed around an inside of an inlet of each of the second opening and the third opening.

7. The charging system according to claim 6,
   wherein the restriction member comprises an insulating member or spring member.

8. A charging system, comprising:
   charger connector means having a positive output section and a negative output section, for connecting to and charging a battery;
   charger body means for housing charger components therein;
   vehicle-body charging means for receiving the charger connector means therein, said vehicle-body charging means including a positive input section and a negative input section connected to a positive terminal and a negative terminal of the battery;
   wherein the negative input section includes a first negative input portion and a second negative input portion, and a first interlock means interlocking with a power switch means, said first interlock means for being turned on when the power switch means is turned off and for being turned off when the power switch means is turned on, the first interlock means being disposed between the negative terminal of the battery and the second negative input portion,
   wherein the positive output section includes a first positive output portion connected to the positive input section and a second positive output portion connected to the second negative input portion, the first positive output portion and the second positive output portion being connected to each other with a coil means of a relay circuit means installed in the charger body means interposed therebetween, and a normally opened relay switch of the relay circuit means in which on and off operations are switched by the coil means is connected to the first positive output portion, and
   wherein when the power switch means is turned off and the charger connector means and the vehicle-body charging connector means are connected to each other, current from the battery is applied to the coil means through the positive input section and the first positive output portion and the second negative input portion and the second positive output portion to turn on the normally opened relay switch.

9. The charging system according to claim 8, further comprising:
   cover means for preventing contact between the positive input section and the negative input section, and an external conductor, is disposed on the vehicle body charging connector means.

10. The charging system according to claim 8, wherein the vehicle-body charging connector means is disposed obliquely downward in the vehicle body at a left side of a leg shield disposed in front of a seat.

11. The charging system according to claim 8, further comprising:
    second interlock means for being interlocked with the power switch means, said second interlock means being turned on when the power switch means is turned off and turned off when the power switch means is turned on, said second interlock means being disposed between the negative terminal of the battery and the first negative input portion.

12. The charging system according to claim 8, wherein the vehicle-body charging means comprises female connector means for connecting to a male connector means, and wherein the charger connector means comprises the male connector means.

13. The charging system according to claim 12, wherein the vehicle-body charging connector means includes a first opening, a second opening, and a third opening into which the first positive output portion, the second positive output portion, and the negative output section of the charger connector means are insertable,
> wherein the positive input section, the first negative input portion, and the second negative input portion are disposed on innermost sides of the first opening, the third opening, and the second opening, respectively, and
> wherein restriction means, for restricting contact between the second negative input portion and the first negative input portion, and the external conductor is disposed around an inside of an inlet of each of the second opening and the third opening.

14. The charging system according to claim 13, wherein the restriction means comprises an insulating member or a spring member.

\* \* \* \* \*